(12) United States Patent
Heravi et al.

(10) Patent No.: US 9,463,964 B2
(45) Date of Patent: Oct. 11, 2016

(54) REMOTE CONTROL AND USER INTERFACE FOR OPERATING A WINCH

(71) Applicant: Warn Industries, Inc., Clackamas, OR (US)

(72) Inventors: Oliver Heravi, Beaverton, OR (US); Kevin Christensen, Portland, OR (US); Bryan Averill, Portland, OR (US); Ian Wendler, Portland, OR (US); Darren Fretz, Oregon City, OR (US); Houman Tavakoli Shiraji, San Diego, CA (US); Barry Atwood, Louisville, KY (US)

(73) Assignee: Warn Industries, Inc., Clackamas, OR (US)

( * ) Notice: Subject to any disclaimer, the term of this patent is extended or adjusted under 35 U.S.C. 154(b) by 250 days.

(21) Appl. No.: 14/462,130

(22) Filed: Aug. 18, 2014

(65) Prior Publication Data
US 2016/0046468 A1    Feb. 18, 2016

(51) Int. Cl.
| G06F 3/048 | (2013.01) |
| B66D 1/40 | (2006.01) |
| B66D 1/54 | (2006.01) |
| G06F 3/0481 | (2013.01) |
| G06F 3/0482 | (2013.01) |
| G08C 17/02 | (2006.01) |
| B66D 1/46 | (2006.01) |
| B66D 1/00 | (2006.01) |

(52) U.S. Cl.
CPC . *B66D 1/40* (2013.01); *B66D 1/00* (2013.01); *B66D 1/46* (2013.01); *B66D 1/54* (2013.01); *G06F 3/0482* (2013.01); *G06F 3/04817* (2013.01); *G08C 17/02* (2013.01); *G08C 2201/30* (2013.01)

(58) Field of Classification Search
CPC ............................. B66D 1/40; G06F 3/04817
USPC ........................................ 715/835
See application file for complete search history.

(56) References Cited

U.S. PATENT DOCUMENTS

| 8,028,599 B2* | 10/2011 | Mack | B60K 20/02 345/161 |
| 2008/0061276 A1* | 3/2008 | Averill | B66D 1/22 254/323 |
| 2014/0076642 A1* | 3/2014 | Gettings | B25J 5/005 180/9.1 |

\* cited by examiner

*Primary Examiner* — William Titcomb
(74) *Attorney, Agent, or Firm* — Alleman Hall McCoy Russell & Tuttle LLP

(57) ABSTRACT

Methods and systems are provided for remotely controlling winch operation via a user interface of a remote. In one example, a user interface of a remote for a winch includes a menu display including a plurality of menu items, the menu items navigable and selectable with a series of buttons of the remote. The user interface further includes a plurality of control displays, each of the plurality of control displays generated upon selection of a corresponding menu item of the plurality of menu items, each of the plurality of control displays including selectable icons for controlling one of an operation of a winch, an operation of one or more auxiliary devices, or settings of the remote.

20 Claims, 11 Drawing Sheets

REMOTE CONTROL AND USER INTERFACE FOR OPERATING A WINCH

FIELD

The present application relates generally to systems and methods for controlling a winch for a vehicle.

SUMMARY/BACKGROUND

Vehicles, such as off-road vehicles, commercial/utility trucks used in construction and by contractors, tow trucks, plow trucks, and other utility vehicles are often equipped with auxiliary systems (e.g., accessories) such as winches, plows, lights, and compressors. The installation of these accessories as aftermarket items may be time-consuming and require an activation switch that may be mounted within an interior of the vehicle to allow a vehicle operator to operate the accessory from within the vehicle. Accordingly, a great deal of wiring may be required to connect the activation switches to the accessories and connect the accessories to the vehicle battery. Additionally, a vehicle operator may be required to manually adjust winch operation at the winch, thereby increasing the time and effort required in winch operation.

In one example, remote winch control may be performed with a remote including a plurality of dedicated buttons for controlling separate winch and auxiliary operations. However, the inventors herein have recognized issues with such a remote. In one example, having one dedicated button for each control operation may increase a number of buttons included on the remote, thereby making control and remote use more complicated. In another example, a remote configured with a plurality of dedicated buttons may limit a number of control functions based on the number of remote buttons, thereby decreasing versatility of remote control.

Thus in one example, the above issues may be at least partially addressed by a user interface of a remote for a winch including a menu display including a plurality of menu items, the menu items navigable and selectable with a series of buttons of the remote and a plurality of control displays, each of the plurality of control displays generated upon selection of a corresponding menu item of the plurality of menu items, each of the plurality of control displays including selectable icons for controlling one of an operation of a winch, an operation of one or more auxiliary devices, or settings of the remote. In one example, the series of buttons may include one or more navigation buttons and a single selection button. As such, the menu items and selectable icons may be navigable with the one or more navigation buttons and selectable with only the single selection button. For example, upon selection of one of the icons of one of the control displays, the remote may send a signal to a control module of a winch to adjust operation of the winch and/or the one or more auxiliary devices. As such, operation of both the winch and the auxiliary devices may be adjusted with a single actuation of a single remote button. As such, the remote may have fewer buttons while still allowing for an increased number of remote control operations. Thus, the user interface may allow a user to more easily navigate between control options and more quickly adjust winch and/or auxiliary operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
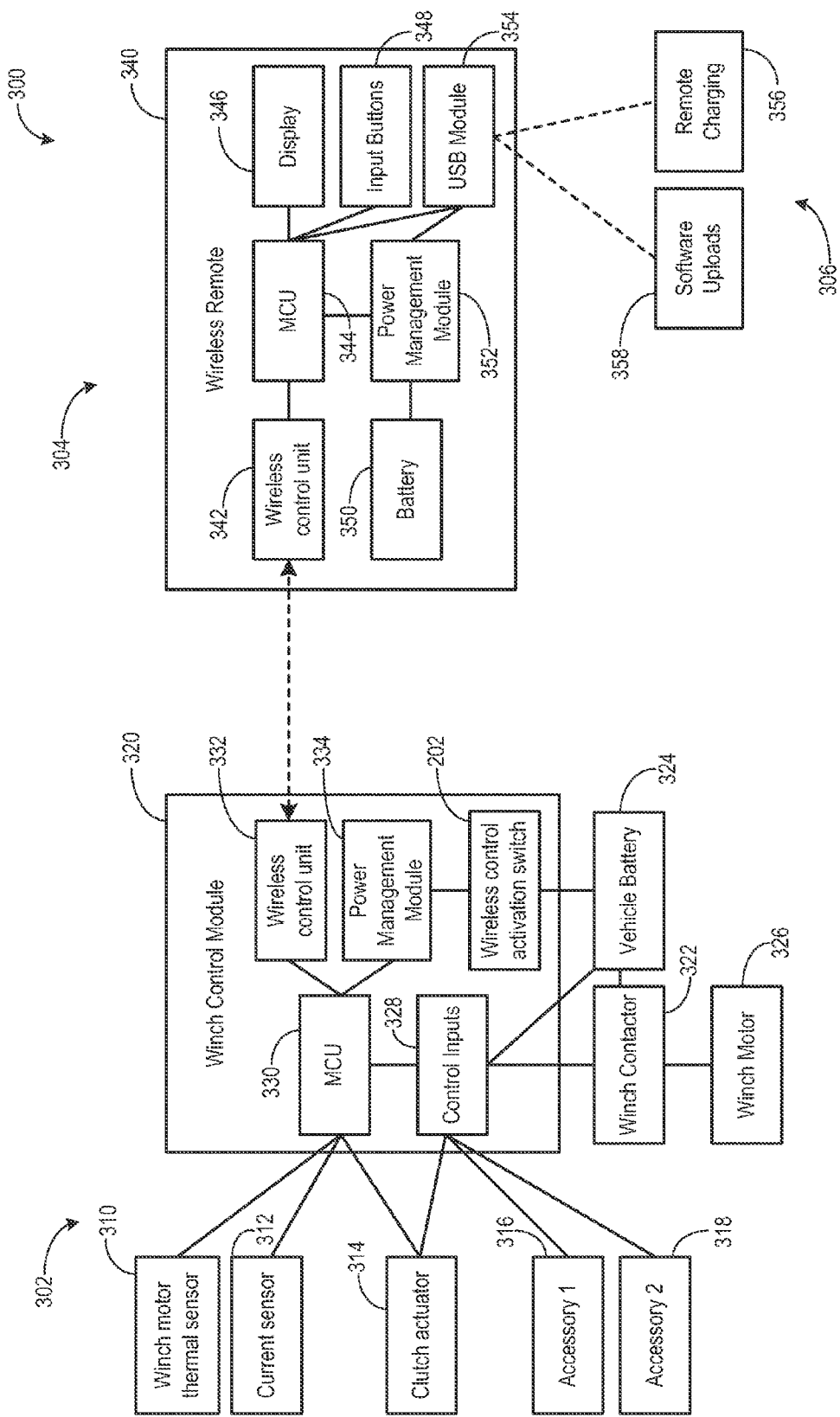
FIG. 3 shows a schematic diagram of a winch and accessory control system.
Figure 4:
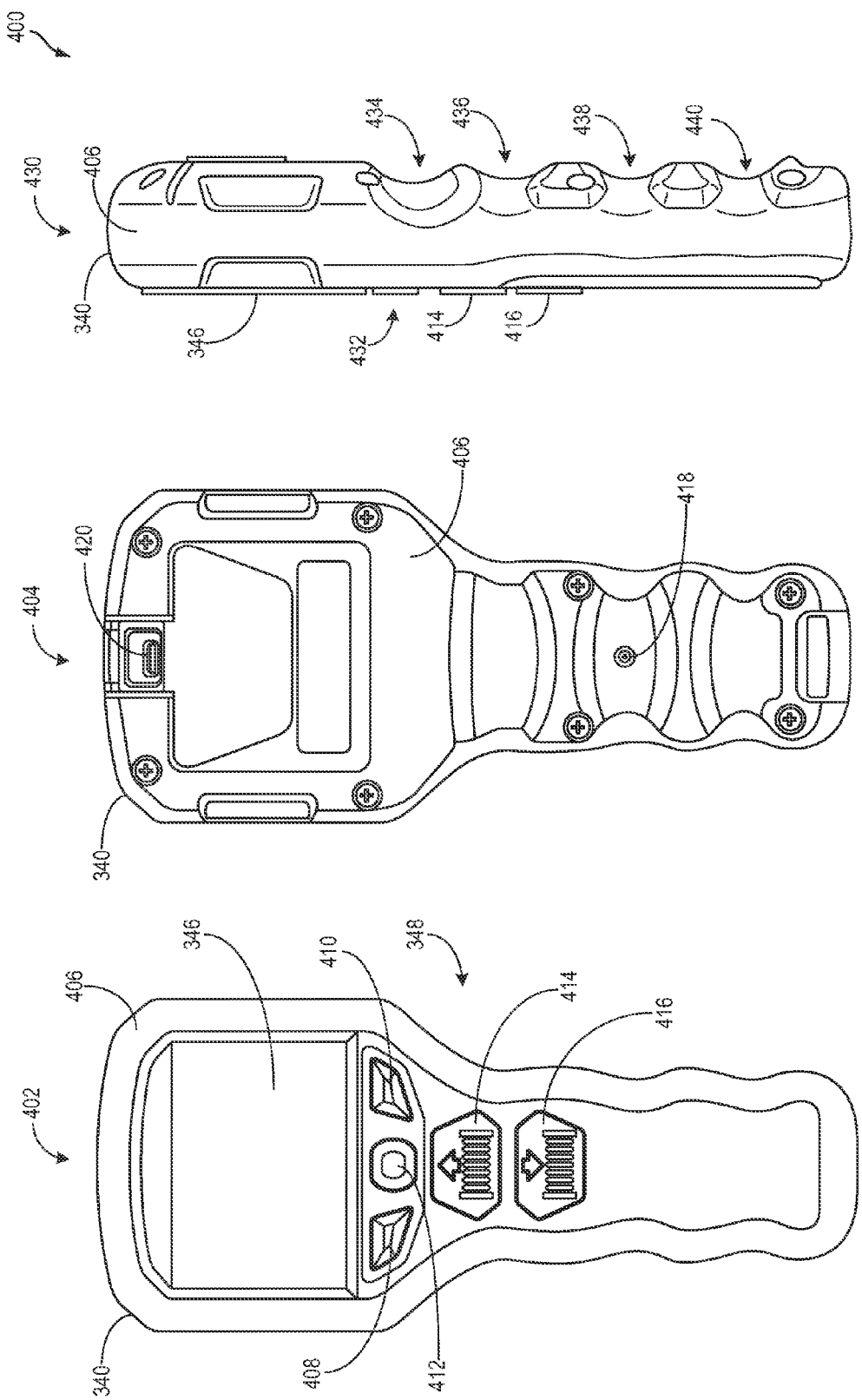
FIG. 4 shows a schematic of a wireless remote for a winch.

The following description relates to systems and methods for remotely controlling winch operation via a user interface of a remote. A winch, such as the winch shown in FIGS. 1-2, may include a control module with instructions for adjusting winch operation. Further, one or more auxiliary systems (or devices) may be electrically coupled with the winch control module. As such, the winch control module may adjust operation of the auxiliary systems by sending control signals (e.g., commands) to the auxiliary systems. In one example, both winch operation and auxiliary system operation may be controlled with a remote in wireless communication with the winch control module, as shown by the schematic in FIG. 3. The remote may include a user interface and a series of buttons, as shown in FIG. 4. Through the series of buttons and displays of the user interface, the remote may control a plurality of winch operations, auxiliary operations, and remote settings. FIGS. 5-14 show a plurality of displays included in the user interface of the remote and a method of navigating through the displays. Additionally, FIG. 15 shows a method for remotely controlling the winch using the user interface of the remote.

Figure 1:
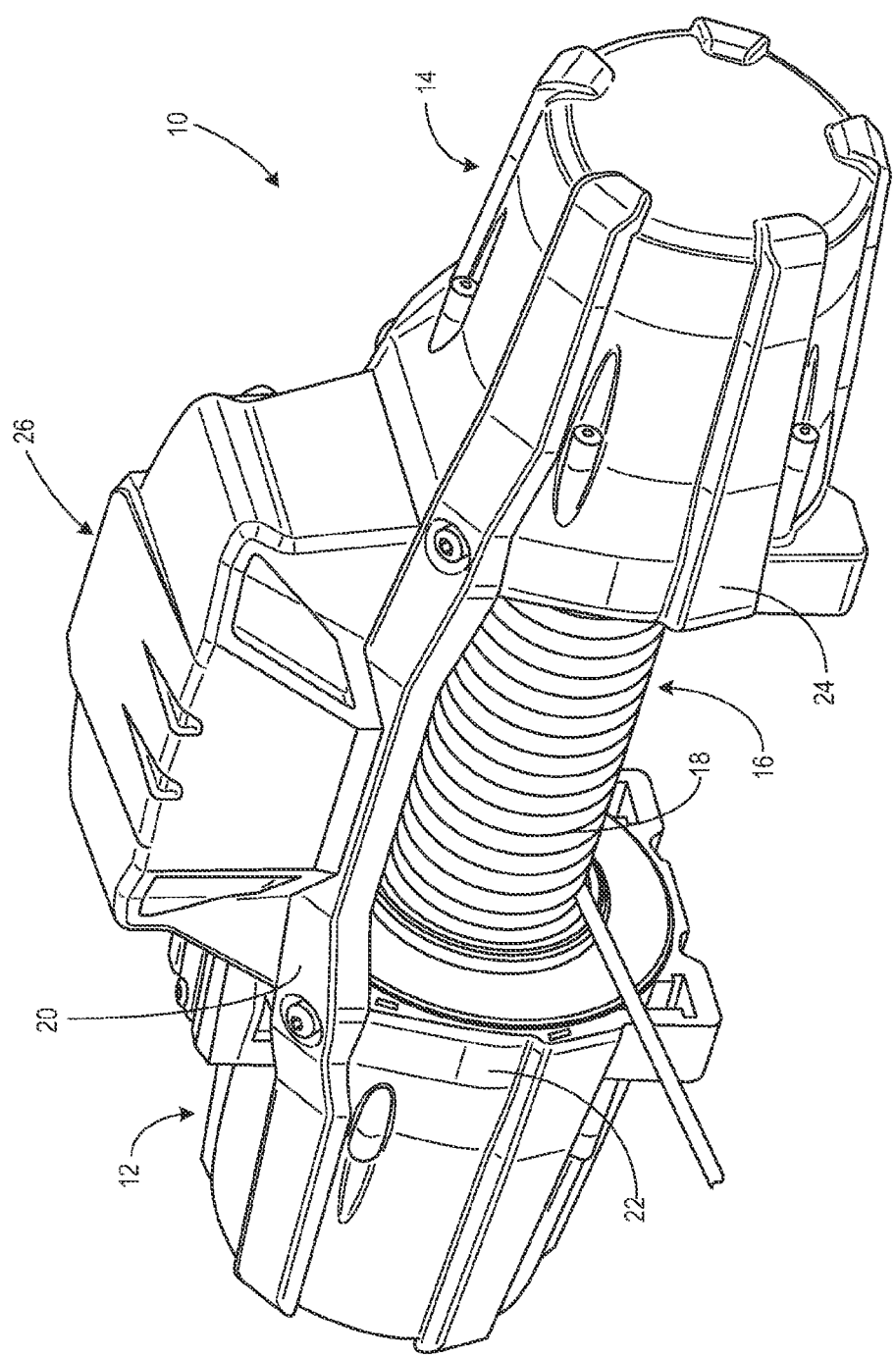
FIG. 1 shows a perspective view of a front side of a winch.

FIG. 1 shows perspective view of a front side of a winch 10. The winch 10 includes a motor assembly 12 drivingly connected to a gear reduction unit 14. The motor assembly 12 includes a motor for operating the winch 10. The motor may be powered by a battery of a vehicle to which the winch 10 is installed, as described further below. For example, the winch 10 may be coupled to a front end of the vehicle. The motor provides power to the gear reduction unit 14 and the gear reduction unit 14 (e.g., transmission of the winch 10) provides driving torque to a rotatable drum 16. The gear reduction unit 14 includes a remote controlled clutch inside the end housing. As shown in FIG. 1, the rotatable drum 16 is a cylinder. A cable 18 (e.g., rope) may be wound onto, or off from, the rotatable drum 16 to provide various pulling operations. For example, based on the direction of rotation of the drum, the cable 18 may be wound out from (e.g., off the drum) or into (e.g., into the drum) the winch 10. A tie plate 20 may be disposed for connection between a first drum support 22 of the motor assembly 12 and a second drum support 24 of the gear reduction unit 14. A control unit 26 may be removably mounted to the tie plate 20. The control unit 26 provides electrical connections and component mounting in a single enclosure. In one example, the control unit 26 is mounted to the tie plate 20. In another example, the control unit 26 is mounted a short distance away from the winch 10 by using a remote mounting kit. The first drum support 22 and the second drum support 24 provide a bearing support structure for rotatably supporting the rotatable drum 16.

Figure 2:
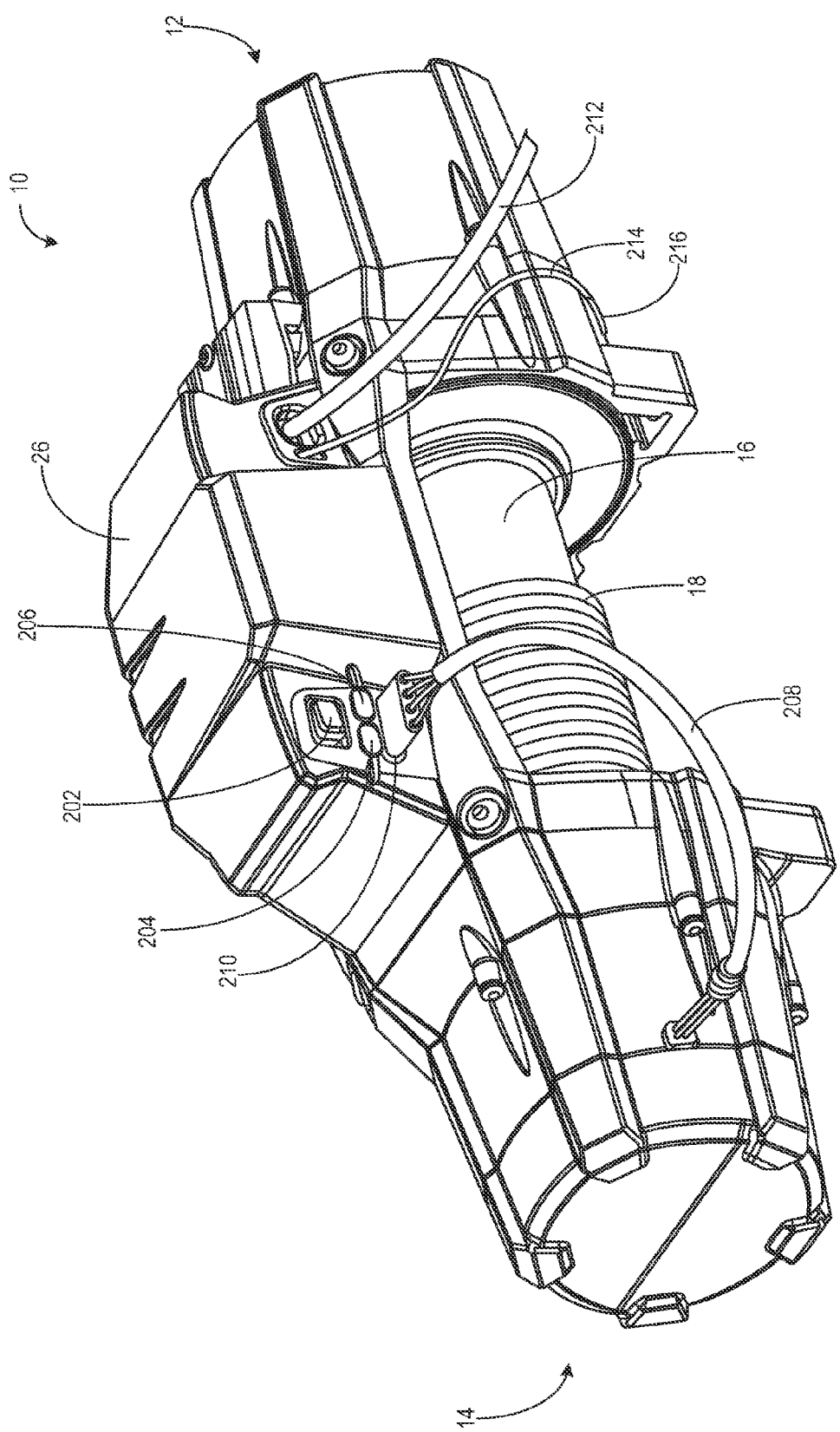
FIG. 2 shows a perspective view of a back side of a winch.

FIG. 2 shows a perspective view of the back side of the winch 10 shown in FIG. 1. As described further below, the winch may be at least partially controlled with a wireless remote (such as the wireless remote shown in FIG. 4, described further below). The winch 10 may include a wireless control activation switch 202 which activates or deactivates a wireless control unit of the winch. The wireless control unit is included in a control module of the winch, as shown in FIG. 3. Further, the control module is included inside the control unit 26. In one example, the wireless control activation switch 202 may be a rocker switch that toggles between an "on" position where the wireless system is activated and an "off" position where the wireless system is deactivated.

The winch 10 may also include one or more auxiliary power ports. As shown in FIG. 2, the winch 10 includes a first auxiliary power port 204 and a second auxiliary power port 206. In alternate embodiments, the winch 10 may include more or less than two auxiliary power ports. A first auxiliary system may be connected to the winch 10 via the first auxiliary power port 204 and a separate, second auxiliary system may be connected to the winch 10 via the second auxiliary power port 206. In this way, the auxiliary power ports may allow the connected auxiliary systems to be controlled through the winch control module. The auxiliary systems may also be referred to herein as accessories or auxiliary devices. Accessories may be defined as electrical devices that are used with or added to the vehicle in which the winch is installed. Accessories may include auxiliary lights (e.g., spot lights, light bars, sport lighting, brake lights, parking lights, warning lights, or the like), axle differential locking mechanisms which are powered by an air compressor or other electronic devices, small powered tools, or the like.

Additionally, the remote controlled clutch of the gear reduction unit may be electrically coupled to the control module of the control unit 26 via a remote controlled clutch wire harness 208. As a result, the wireless remote in communication with the winch control module may control the clutch to engage and disengage with the gear train of the winch (inside the gear reduction unit 14). As shown in FIG. 2, the wireless control activation switch 202, the first auxiliary power port 204, the second auxiliary power port 206, and an input port 210 for receiving a control module end of the wire harness 208 are all positioned on a back exterior surface of the control unit 26. More specifically, all of these switches and input are positioned on a same side of the control unit 26. This may increase the ease of access to the switches and control ports for activating/deactivating the wireless control activation switch and for connecting the auxiliary devices and clutch to the control module.

As also shown in FIG. 2, a power cable 212 is coupled between the control module of the control unit 26 and a battery (not shown in FIG. 2). The battery may be a vehicle battery of a vehicle to which the winch 10 is coupled to. As such, the power cable 212 enables power to be supplied to the winch 10 from the vehicle battery. The winch 10 also includes a control unit ground wire 214 providing grounding of the control module. A ground cable may then be coupled between a ground of the vehicle battery and a first end 216 of the control unit ground wire.

Turning to FIG. 3, a schematic 300 shows a diagram of a winch and accessory control system. The system includes a vehicle portion 302 wirelessly connected with a user input portion 304 and connectivity portion 306 connected with the user input portion 304. In FIG. 3, the solid lines between system components represent physical electrical connections between the components while dashed lines between system components represent wireless connections between those components. More specifically, the vehicle portion 306 includes components of a winch (such as winch 10 shown in FIGS. 1-2) including a winch control module 320 and one or more accessories which are coupled to a vehicle in which the winch is installed. As one example, the winch control module 320 resides within the control unit 26 which can be on or near the winch 10. The user input portion 304 may include a wireless remote 340 for providing control signals to the winch control module 320 and for receiving the feedback signals from the winch control module 320.

The vehicle portion 302 includes a winch motor 326 which is positioned within the motor assembly 12 of the winch 10. A winch motor thermal sensor 310 may be coupled to the motor and measure a temperature of the winch (e.g., a motor temperature). The vehicle portion 302 may also include a current sensor 312 and/or a freespool clutch actuator 314 coupled to the winch. When the clutch of the winch 10 is disengaged from the winch transmission (e.g., gear reduction unit 14) the drum may rotate freely without input from the gear reduction unit and motor. As such, the drum may be in a freespool position. In one example, the clutch actuator 314 is an electrical device such as an electrical solenoid for shifting the winch transmission into a disengaged state to move the drum into the freespool position and for shifting the transmission back into an engaged state with the drum for normal winch powering in or powering out (e.g., winching). Additionally, the vehicle portion 302 may include one or more accessories coupled to the vehicle. FIG. 3 shows a first accessory (e.g., first auxiliary system) 316 and a second accessory (e.g., second auxiliary system) 318.

As described above, the winch control module 320 is included in the control unit 26 (shown in FIGS. 1-2) of the winch 10. The control unit 26 of the winch 10 also includes a winch motor contactor 322. Both the winch motor contactor 322 and the winch control module 320 are connected to a vehicle battery 324. The winch control module 320 provides control signals to the winch motor contactor 322 which can supply current from the vehicle battery 324 to the winch motor 326. The winch control module 320 also controls the clutch actuator 314, as described above. Additionally a plurality of accessories, such as the first accessory 316 and the second accessory 318 may be connected to the control module 320 at a plurality of control inputs 328 of the control module 320. For example, as shown in FIG. 2, the first accessory 316 may be directly coupled to the first auxiliary power port 204 and the second accessory 318 may be directly coupled to the second auxiliary power port 206. The first auxiliary power port 204 and the second auxiliary power port 206 may be two of the control inputs 328. The control inputs 328 may further include a winch contactor control input that communicates with the winch contactor 322. Additionally, the control inputs 328 may include a winch clutch actuator input for communicating with the clutch actuator 314.

The winch control module 320 further includes a microcontroller unit (MCU) 330 containing programmable data for operating the winch components and the plurality of accessories coupled to the winch control module 320. For example, the control module 320 may provide control signals to the accessories 316 and 318 via the MCU 330 and the accessories may provide feedback signals to the MCU 330 of the winch control module 320. Further, the control module 320 may provide an electrical connection between the vehicle battery 324 and the accessories 316 and 318 through the associated control inputs.

A power management module 334 of the winch control module 320 may distribute power from the vehicle battery 324 to the winch motor 326 and various accessories 316 and 318. Additionally, the winch control module 320 may switch on or off the winch 10 and accessory (e.g., accessories 316 and 318) electric power according to input commands received from the wireless remote 340. The control programming for operating the power management module 334 resides within the MCU 330 of the winch control module 320.

Instructions for operating a wireless control unit 332 of the winch control module 320 are also stored within the MCU 330. As introduced above, the wireless remote 340 may provide control signals to the winch control module 320 and receive feedback signals from the winch control module 320. In this way, the wireless control unit 332 provides two-way communication between the winch control module 320 and the wireless remote 340. As one example, the communication between the winch control module 320 and the wireless remote 340 may be performed by the wireless control unit 332 by a pairing process that provides a two-way RF mesh network connection using a secured and encrypted wireless communication protocol.

The winch control module 320 further includes the wireless control activation switch 202, as also shown in FIG. 2. The wireless control activation switch 202 is coupled to power management module 334 and may activate and deactivate the wireless control unit 332. For example, the wireless control activation switch 202 must be on (e.g., activated) in order for the wireless remote 340 to operate the winch. The wireless control unit 332 may use current from the vehicle battery 324. Thus, when the wireless control unit 332 is not in use, the wireless control activation switch may be turned off (e.g., deactivated) in order to deactivate the wireless control unit 332 and reduce power consumption of the vehicle battery 324. In some examples, the wireless control activation switch 202 may be a power control switch for the inch control module 320. As such, turning off the switch 202 may turn off the winch control module, thereby stopping current flow to the winch control module 320 from the vehicle battery. The switch 202 may reduce consumption of the vehicle battery 324 when the winch is not being used.

The wireless remote 340 also includes a wireless control unit 342 for communicating with the wireless control unit 332 of the winch control module 320. As such, the wireless remote 340 may send control signals for adjusting winch operation and/or operation of one or more of the first accessory 316 and the second accessory 318 to the winch control module 320 via the wireless control unit 342. The control signals may be generated by a microcontroller unit (MCU) 344 of the wireless remote 340. The MCU 344 may contain programmable data (e.g., stored on a memory of the MCU 344) for processing inputs received from one or more of a display 344 and input buttons 348 of the wireless remote 340. The MCU 344 may then send signals corresponding to the received inputs to the MCU 330 of the winch control module 320, which may in turn accordingly adjust operation of the winch and/or accessories. Additionally, the wireless remote 340 includes a battery 350, a power management module 352, and a USB module 354. In one example, the battery 350 may be charged through the USB module 354 via a remote charging input 356. The wireless remote 340 may also receive software uploads 358 that may include instructions for operating the wireless remote 340 and processing signals received at the MCU 344 from the various inputs (e.g., input buttons 348). In one example, these instructions may be stored within the memory of the MCU 344. The remote charging input 256 and the software uploads may either be received wirelessly at the USB module 354 or via a wired electrical connection.

The wireless remote 340 may be a handheld device for controlling the winch and accessory functions of one or more accessories. More specifically, the wireless remote 340 may be the only remote operating the winch 10 and one or more accessories (e.g., first accessory 316 and second accessory 318) and may operate the winch and accessories without requiring separate control switches on the winch or vehicle. An exemplary handheld wireless remote 340 is shown in FIG. 4. Schematic 400 of FIG. 4 shows a front view 402, a back view 404, and a side view 430 of the wireless remote 340. The wireless remote 340 includes a housing 406 with a series of input buttons 348 (referred to herein as buttons) for control input and a display screen 346 for system control options and feedback.

The display screen 346 may include an LCD screen that displays a user interface. The user interface may include a series of displays (e.g., menu displays and/or control displays) that are presented to a user via the display screen 346 (e.g., display) and allow the user to select different winch and accessory control options from the displayed user interfaces. Example displays of the user interface that are presented via the display screen 346 are shown in FIGS. 5-14, discussed further below. The display screen 346 may provide winch control options (e.g., via function menus), accessory control options, and visual feedback to the user. The feedback may include the status of control inputs such as winch power-in or power-out (e.g., winching the cable in or out via the drum), accessories on or off, and to indicate which control mode has been selected or which control modes are currently available. Feedback may also include information such as vehicle battery voltage, remote battery level, winch motor current draw, winch motor temperature, winch load, and winch clutch position. Additionally, system warnings or errors may also be presented to the user via the display screen 346.

In one embodiment, the display screen 346 may also display feedback of the functional characteristic of accessories such as the pressure of an air compressor or the power level of the lighting system. Photographs, maps, user manuals, homepages, and other images may be uploaded into the MCU 344 of the wireless remote 340 for display on the display screen 346. The user manual can include illustrations of proper use of the winch as well as safety tips and safety warnings. The safety tips and safety warnings displayed on the display screen 346 of the wireless remote 340 can be required to be acknowledged by the user as an initial setup, or as a periodic warning.

Figure 7:
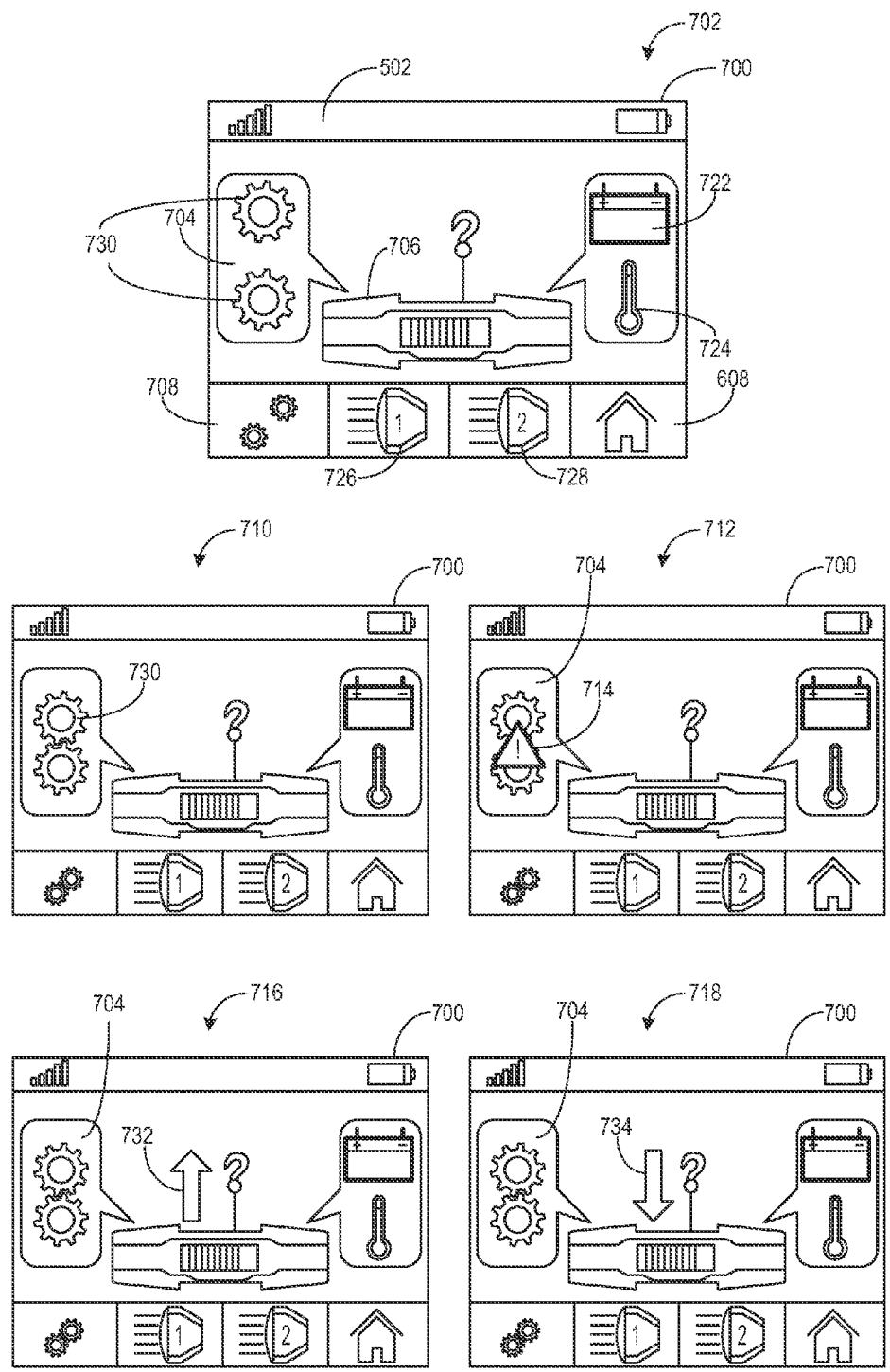

The buttons 348 include a first navigation button 408, a second navigation button 410, a selection button 412, a winch power-out button 414, and a winch power-in button 416. The first navigation button 408 and the second navigation button 410 navigate through each menu display (e.g., menu displays and/or control displays) displayed via the display screen 346. In one example, the first navigation button 408 may be a left button that navigates left through each menu display. Likewise, the second navigation button 410 may be a right button that navigates right through each menu display. Additionally, the first navigation button 408 and the second navigation button 410 may be used to confirm and/or activate certain user interface displays. For example, by pressing both the navigation buttons together at one time, a specific control display may be presented on the display screen 346. The specific control display may be a winch operation display, as shown in FIG. 7. Thus, by holding down both the first navigation button 408 and the second navigation button 410 simultaneously, a user may access a control display for adjusting winch operation. As shown in FIG. 4, the first navigation button 408 and the second navigation button are positioned on opposite sides of the remote from one another. More specifically, the first navigation button 408 is positioned to the left of the selection button 412 and the second navigation button 410 is positioned to the right of the selection button 412. Said another way, the selection button 412 is positioned between the two navigation buttons. As a result of the two navigation buttons positioned away from each other on opposite sides of the remote, a user must use two hands to simultaneously actuate (e.g., press) both navigation buttons and thus reach the winch operation display. This feature may reduce the likelihood of a user adjusting winch operation in error. In this way, winch operation may only be adjusted from the winch operation control display, which may only be reachable by simultaneously pressing the two navigation buttons.

In alternate embodiments, the wireless remote 340 may only include one navigation button to navigate through all the menu displays. The selection button 412 allows a user to select and/or confirm items displayed on the display screen 346. Winch power-in and power-out operation may be controlled by the winch power-in button 416 and the winch power-out button 414. As discussed above, winch power-in operation may include rotating the drum of the winch in a first direction (e.g., powered by the transmission and motor) where the cable around the drum is wound onto the drum (e.g., cable pulled into the winch). The winch power-out operation may include rotating the drum of the winch in a second direction (e.g., powered by the transmission and motor), opposite the first direction, where the cable is wound off the drum (e.g., cable pulled out from the winch). In one example, the winch power-in button 416 and the winch power-out button 414 may exclusively control winch power-in and power-out operation without requiring input via any additional buttons. The wireless remote 340 may also include a reset button 418 for restarting the remote when it functions improperly. The wireless remote 340 may also include a USB charging port 420 as part of the USB module 354.

Further, the first navigation button 408, the second navigation button 410, and the selection button 412 are arranged in a single top row of buttons 432. The single top row of buttons are positioned vertically above the winch power-out button 414 and the winch power-out button 414 is positioned vertically above the winch power-in button 416, as seen in front view 402 and side view 430. As seen in the side view 430, the housing 406 of the wireless remote 340 includes a plurality of concave grooves shaped to fit a user's fingers. For example, the housing 406 includes a topmost first groove 434 positioned at a similar vertical position to the top row of buttons 432. Said another way, the first groove 434 is positioned opposite the top row of buttons 432 with respect to a front and back of the wireless remote 340. A second groove 436 is positioned vertically below the first groove 434 and at a similar vertical position as the winch power-out button 414 and the winch power-in button 416. More specifically, the second groove 436 is positioned opposite a position between the winch power-out button 414 and the winch power-in button 416 with respect to a front and back of the remote. A third groove 438 is positioned vertically below the second groove 436 at a vertical position below the winch power-out button 414 and the winch power-in button 416. A fourth groove 440 is positioned vertically below the third groove 438.

The vertical positioning of the plurality of grooves 434-440 with respect to the remote buttons 348 may allow a user to comfortably and effectively access the buttons of the remote. For example, when a user holds the wireless remote 340 with each of four index fingers positioned in each of the four grooves, a user's thumb may be positioned over the top row of buttons 432 and not over the winch power-out button 414 and winch power-in button 416. This may allow a user to quickly navigate through the user interface displays and select different control options. Further, it may reduce the chance of a user accidentally selecting the winch power-in or power-out function (and accidentally engaging or disengaging the winch clutch) via pressing the winch power-out button 414 and/or winch power-in button 416. In this way, the wireless remote 340 may be adapted to allow a user to operate the remote with a single handle except for when activating the winch operation mode (via simultaneously actuating both navigation buttons). If a user moves a position of their hand such that their first three index fingers are positioned in second groove 436, third groove 438, and fourth groove 440, a user's thumb may then be positioned over the winch power-out button 414 and winch power-in button 416, thereby allowing a user to more easily access the winching functions and adjust winch operation.

As introduced above, the display screen of the remote (e.g., wireless remote 340) may display a user interface including a plurality of displays (e.g., user interface displays). For example, the user interface may include a menu display and a plurality of control displays. The various displays may allow a user to select control options for controlling winch operation and operation of one or more auxiliary devices electrically coupled to the winch. Further, the displays may present operation status information for the winch and auxiliary devices to the user. The various displays presented via the display screen may be navigable with the input buttons of the remote (e.g., input buttons 348 shown in FIG. 4). More specifically, the items or options within each display may be navigable with the first navigation button 408 and the second navigation button 410. Each item or option within each display may then be selectable with the selection button 412 once they have been navigated to with the navigation buttons. As such, display items within each display may be selectable with only a single button. FIGS. 5-14 show example user interfaces (e.g., displays) that may be presented to a user via the display screen of the remote (e.g., display screen 346 of the remote 340).

Figure 5:
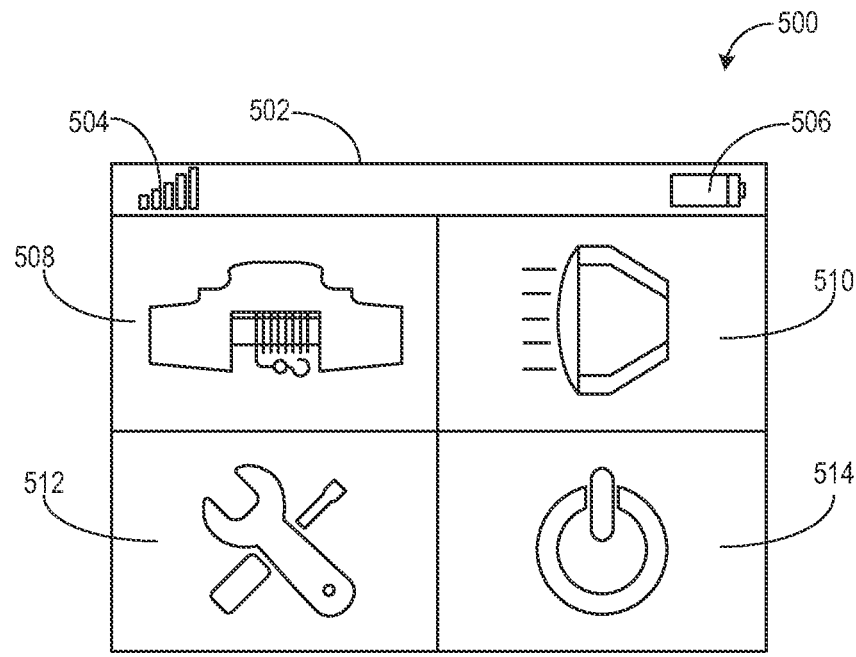
FIGS. 5-13 show example user interface displays of a wireless remote for a winch.

FIG. 5 shows a menu display 500 of the remote. The menu display may be displayed on the remote display screen after turning on the remote. Additionally, the menu display may be a home menu display where all other displays may be reached from. For example, the other displays reachable from the menu display 500 may be referred to herein as control displays. All of the user interface displays, including the menu display 500, may include a status bar 502. The status bar 502 includes a wireless signal strength icon 504 displaying the strength of the wireless signal between the remote and the winch control module and a battery level icon 506 displaying the battery level of the remote. In alternate embodiments, the status bar 502 may include additional or alternate remote status information.

The menu display 500 includes a plurality of menu items. In one example, as shown in FIG. 5, the menu items include a winching icon 508, an auxiliary icon 510, a settings icon 512, and a power icon 514. Upon selection if the power icon 514, the MCU of the remote may receive a signal requesting that the wireless remote be turned off. As a result, the remote may shut down (e.g., the remote MCU may send a signal to the remote power management module to shut down the remote). Each of the winching icon 508, the auxiliary icon 510, and the settings icon 512 represent a series of remote operations. Upon selection of each of the menu items, a corresponding control display is generated, as discussed further below. The control displays may include a winch operation display (shown in FIG. 7), auxiliary operation display (shown in FIG. 8), and a settings menu display (shown in FIG. 9).

Figure 6:
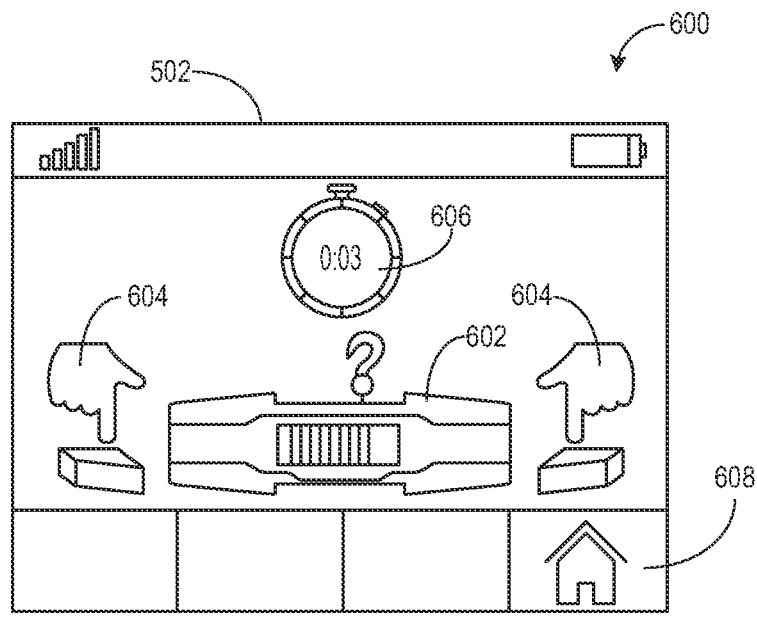

For example, a user may select the winching icon 508 in order to adjust winch operation. After selecting the winching icon 508, a winch actuation display 600 is presented on the display screen, as shown in FIG. 6. The winch activation display 600 includes the status bar 502 and a winch icon 602. The winch activation display 600 may be an intermediate display between the menu display 500 and a winch operation display 700. At the winch activation display 600, a user may be prompted to actuate two buttons of the remote simultaneously via two button icon 604. For example, upon receiving an actuation of the first navigation button 408 and the second navigation button 410 at the same time for a first duration, the remote may display the winch operation display 700. In one example, the first duration may be approximately three seconds. The time for simultaneously actuating the two remote buttons may be displayed with the winch activation display 600 via a countdown timer icon 606. In this way, a single actuating event may include receiving two simultaneous inputs from two different input buttons for an input duration. In another example, the first duration (e.g., input duration) may be greater or less than three seconds. Said another way, the winch operation display 700 is reachable from the winch activation display 600 by a single user activation event at one time and without any additional inputs following the single user activation event. The winch operation display 700 may also be reachable from any other control display (e.g., any other display presented via the user interface of the display screen) by simultaneously selecting the first navigation button 408 and the second navigation button 410 for the first duration. If the winch activation display 600 is idle for a second duration, longer than the first duration, the display screen may switch from presenting the winch activation display 600 to presenting the menu display 500. In one example, the second duration is approximately one minute. Additionally, the winch activation display 600 includes a home icon 608. Upon selection of the home icon 608 (via only a single user input at one time), the remote system may again display the menu display 500.

FIG. 7 shows the winch operation display 700. The winch operation display 700 allows a user to control operation of the winch including engaging and disengaging the clutch and viewing winch operational status such as freespool operation or a winch operation direction (e.g., either powering-in or powering-out the cable). Additionally, the winch operation display 700 also allows the remote user to control auxiliary systems, monitor a vehicle battery level, and monitor winch motor temperature.

More specifically, FIG. 7 shows various views of the winch operation display 700 during different operational modes of the winch. The winch operation display 700 includes a clutch status display 704 that visually shows whether the clutch of the winch is engaged with the drum, thereby allowing power to be transferred from the winch motor to the drum and winch cable, or whether the clutch of the winch is disengaged from the drum, thereby allowing the drum to freespool (e.g., rotate freely without power from the winch motor). The clutch status display 704 includes two gear icons 730 showing whether the clutch is engaged or disengaged. For example, in first view 702, the two gear icons of the clutch status display 704 are positioned apart from one another (e.g., spaced a distance apart from one another), thereby indicating to a user that the winch clutch is disengaged (e.g., not coupled with the drum). Conversely, in second view 710, the two gear icons of the clutch status display 704 are positioned together (e.g., touching), thereby indicating to the user that the clutch is engaged (e.g., coupled with the drum).

A clutch engagement icon 708 is selectable with the buttons of the remote (e.g., selectable with selection button 412) in order to move the clutch into engagement or disengagement with the drum. The clutch engagement icon 708 may also display two gear icons in a same position as the gear icons 730 of the clutch status display 704. For example, if the clutch is currently engaged (as shown in second view 710), upon receiving an input selection from the user via the clutch engagement icon 708, the MCU of the remote may send a signal to the MCU of the winch commanding the clutch to move into the disengaged position. Once the clutch is successfully disengaged, the MCU of the winch may send a signal to the MCU of the remote indicating that the clutch has been disengaged. As a result, both the clutch engagement icon 708 and the clutch status display 704 may change from engaged (e.g., the two gear icons coupled together) to disengaged (e.g., the two gear icons spaced apart from one another), as shown in first view 702. In this way, the winch operation display 700 provides current clutch status information and feedback of the clutch position after inputting a command via buttons of the remote.

If the clutch does not disengage or engage when requested by the user, a warning error 714 may be generated within the clutch status display 704. For example, as shown in third view 712, if the clutch does not disengage when requested (e.g., upon receiving an input from the user), the warning error 714 is displayed in the clutch status display 704.

The winch operation display 700 further includes a winch operation direction status display 706. The winch operation direction status display 706 presents to a user whether the winch drum is rotating and in which direction the winch drum is rotating. For example, fourth view 716 shows the winch in a winching power-out mode. Specifically, the winch operation direction status display 706 shows an arrow (e.g., directional arrow) 732 pointing away from a winch icon, thereby indicating the drum is rotating in a first direction where the winch cable is being wound off the drum (e.g., pulled out and away from the winch). Fifth view 718 shows the winch in a winching power-in mode. More specifically, the winch operation direction status display 706 shows an arrow 734 pointing toward the winch icon, thereby indicating the drum is rotating in a second direction, opposite the first direction, where the winch cable is being wound onto the drum (e.g., pulled into the winch). In both modes, the clutch is engaged, as shown by the clutch status display 704 in the fourth view 716 and fifth view 718.

As described above with reference to FIG. 4, upon receiving an input via winch power-out button 414, the MCU of the remote may send a signal to the MCU of the winch commanding the clutch to be engaged (if not already engaged) and the drum to rotate to feed rope off the drum.

Once the drum is operating in the power-out mode, the MCU of the winch may send a signal to the MCU of the remote. In response, the winch operation direction status display 706 shows the display in fourth view 716. In this way, a single input via power-out button 414 or power-in button 416 may cause the drum to rotate (e.g., begin winching) and/or change a direction of rotation of the drum. Additionally, a single input via power-out button 414 or power-in button 416 may cause the clutch to engage. As such, the clutch may be engaged by a plurality of single inputs, the plurality of single inputs including each of input via power-in button 416, input via power-out button 414, and input via selection of the clutch engagement icon 708. In other embodiments, the clutch may also be re-engaged after being in the disengaged position for a duration of time and/or upon selection of the home icon 608. Upon selection of the home icon 608, the menu display 500 may again be displayed via the user interface of the remote. Further, in some examples, the winch clutch may only be adjusted into or out of engagement with the drum using the power-in button 416 and the power-out button 414 from the winch operation display 700. For example, if a different control display (or menu display) is displayed via the user interface and a user presses one of the power-in button 416 or the power-out button 414, a message may appear in the display prompting the user to navigate to the winch operation display 700 by simultaneously activating the right and left navigation buttons. In this way, winch operation may only be controlled from the winch operation display and no other control display or menu display of the user interface. This may reduce unintended adjustments to winch operation by activating an incorrect button or menu item in another control display.

The winch operation display 700 further includes a vehicle battery level display 722 and a winch motor temperature display 724. The vehicle battery level display 722 presents to the user, via the user interface, a current battery level of the vehicle battery (e.g., the vehicle battery powering the control module of the winch). In one example, the vehicle battery level display 722 includes a battery icon with a line indicating the battery. As such, the line may adjust (or move) within the battery level display 722 as the vehicle battery changes. For example, the line may move to a bottom of the battery icon as the vehicle battery level decreases. The winch motor temperature display 724 presents an operating temperature of the motor of the winch. The winch motor temperature display 724 may include a thermometer icon with a line indicating the winch motor temperature. As such, the line may adjust within the motor temperature display 724 as the motor temperature changes (e.g., the line may move closer to a top of the display as the temperature increases). Both of these displays allow the remote user to remotely monitor the operation status of the vehicle and the winch. As a result, a user may take actions based on these displays (e.g., stop winch operation if the battery level decreases below a threshold level and/or if the winch motor temperature increases above a temperature threshold).

Auxiliary systems coupled to the winch (e.g., electrically coupled) may also be controlled via the winch operation display 700. As shown in FIG. 7, the winch operation display 700 includes a first auxiliary icon 726 and a second auxiliary icon 728. The first auxiliary icon 726 and the second auxiliary icon 728 may be selectable in order to control operation of a first auxiliary system and second auxiliary system, respectively, electrically coupled to the winch control module. For example, a user may select the first auxiliary icon 726 in order to turn on (if the system is currently off) or turn off (if the system is currently on) the first auxiliary system. For example, the first auxiliary icon 726 may be selected in order to turn on or turn off an auxiliary lighting system. Similarly, selecting the second auxiliary icon 728 may turn on or turn off the second auxiliary system. Thus, one or more auxiliary systems may be turned on or off with a single user input (e.g., selection via the user interface). In this way, both operation of the winch and one or more auxiliary systems are controllable from a single control display (e.g., the winch operation display).

In alternate embodiments, the winch operation display 700 may include more or less than two auxiliary icons. In one example, the number of auxiliary icons displayed in the winch operation display 700 may change based on the number of auxiliary systems electrically connected to the winch control module.

Figure 8:
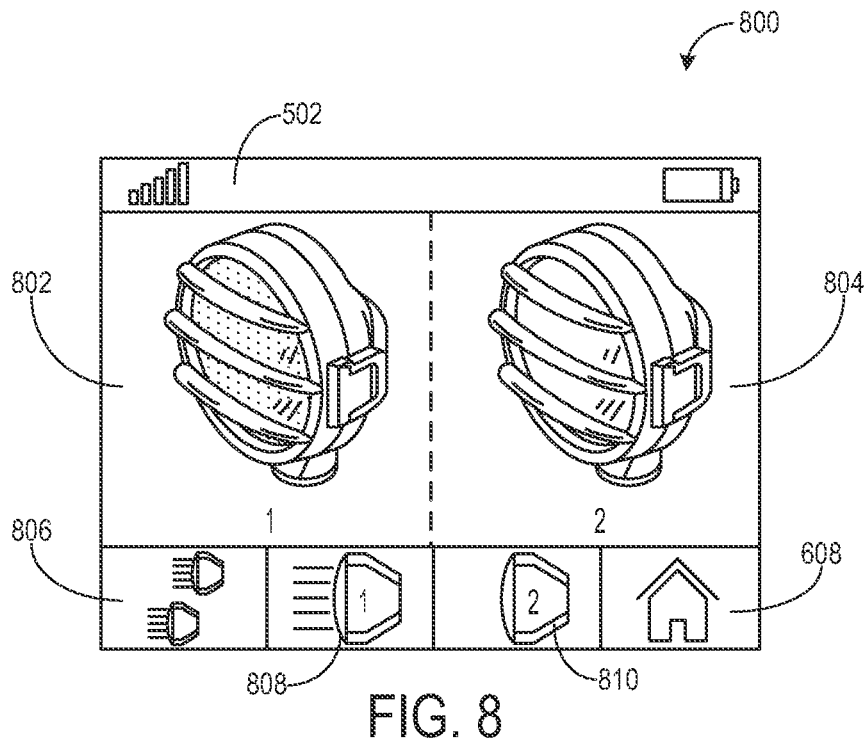

FIG. 8 shows another control display of the user interface of the remote. The control display shown in FIG. 8 is an auxiliary operation display 800 allowing a user to control operation of the one or more auxiliary systems (e.g., accessories) coupled with the winch. In one example, the auxiliary operation display 800 is reachable by selection of the auxiliary icon 510 in the menu display 500. More specifically a single selection (or input) from the menu display may result in the generation of the auxiliary operation display 800. The auxiliary operation display 800 includes the status bar 502, a first auxiliary status display 802, a second auxiliary status display 804, a dual auxiliary icon 806, a first auxiliary icon 808, a second auxiliary icon 810, and the home icon 608. The first auxiliary status display 802 visually displays the current operational status of the first auxiliary system coupled to the winch while the second auxiliary status display 804 visually displays the current operational status of the second auxiliary system coupled to the winch. As shown in FIG. 8, each of the first auxiliary status display 802 and the second auxiliary status display 804 include a light icon representing the corresponding auxiliary system (e.g., such as an auxiliary light). If the first auxiliary system is on, the first light icon of the first auxiliary status display 802 appears illuminated (e.g., shaded), as shown in FIG. 8. If the first auxiliary system is off, the second light icon of the second auxiliary status display 804 appears unilluminated (e.g., outlined), as shown in FIG. 8. In this way, a user may easily see the status of at least two winch auxiliary systems. If only one auxiliary system is coupled to the winch, the auxiliary operation display 800 may only include one auxiliary status display. In another embodiment, if only one auxiliary system is coupled to the winch, the auxiliary status display corresponding to the non-existent auxiliary system may display as being turned "off" and/or include an additional icon in the display indicating no second auxiliary system is coupled to the winch.

The first auxiliary icon 808 and the second auxiliary icon 810 may operate similarly to the first auxiliary icon 726 and the second auxiliary icon 728 of the winch operation display 700, as described above. As such, upon receiving a selection of the first or second auxiliary icons 808 and 810, the MCU of the remote may send a signal to the MCU of the winch commanding the corresponding auxiliary system to be turned on or off (e.g., the opposite of the current operational state—on if the system if off and off if the system is on). Thus, the first and second auxiliary systems may be turned on and off individually by selecting the first auxiliary icon 808 or the second auxiliary icon 810 (with the buttons of the remote, as described above).

Alternatively, the first and second auxiliary systems may be controlled together at the same time by selecting the dual auxiliary icon 806. For example, selecting the dual auxiliary icon 806 may turn on both the first and second auxiliary systems together, turn off both the first and second auxiliary systems, or turn one system off and one system on at the same time. When referring to selecting or receiving a selection at "the same time", it means the selection occurred via one actuation event (e.g., a single button push) in time. Thus, only one actuation of a single icon may result in both auxiliary systems changing operational status. Further, selecting the home icon 608 of the auxiliary operation display (e.g., auxiliary operation menu) may again generate the menu display 500.

Figure 9:
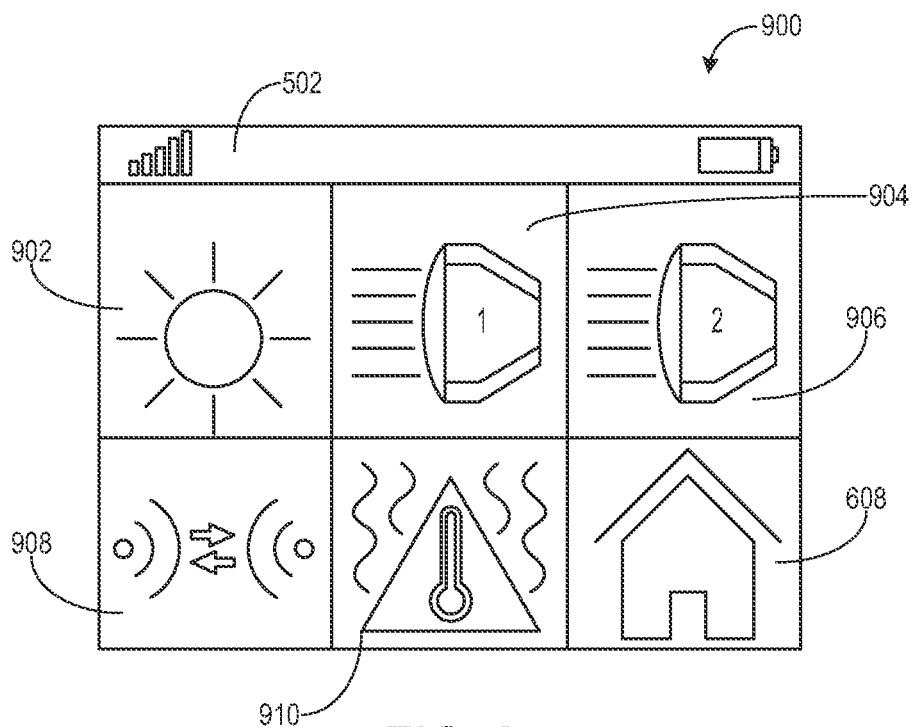

FIG. 9 shows yet another control display of the user interface of the remote. The control display shown in FIG. 9 is a settings menu display 900 allowing a user to adjust remote settings including adjusting display screen brightness, paring the remote with the winch control module, linking auxiliary systems to a high beam setting, and activating a thermal shut-off option. In one example, the settings menu display 900 is reachable by selection of the settings icon 512 in the menu display 500. More specifically a single selection (or input) from the menu display may result in the generation of the settings menu display 900. The settings menu display 900 includes the status bar 502, a brightness icon 902, a first auxiliary icon 904, a second auxiliary icon 906, a pairing icon 908, a thermal protection icon 910, and the home icon 608. Upon receiving a user selection of each of the brightness icon 902, first auxiliary icon 904, second auxiliary icon 906, pairing icon 908, and thermal protection icon 910, the MCU of the remote generates and displays a corresponding control panel on the display screen. For example, a specific control panel may be displayed over the settings menu display 900 after selection of one of the icons. The various control panels are shown in FIGS. 10-13.

Figure 10:
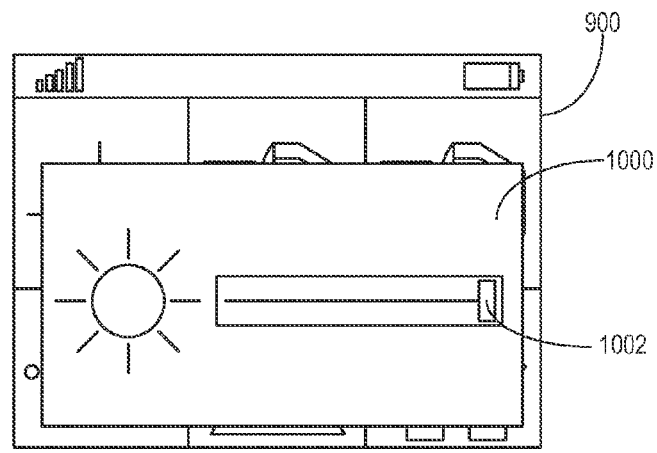
Figure 11:
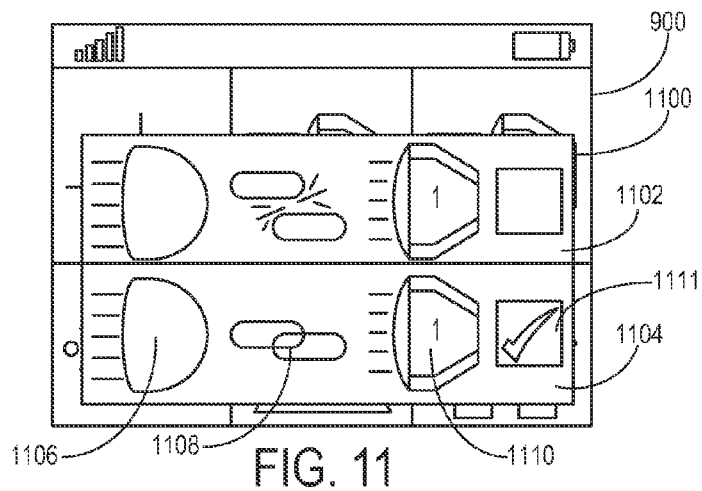
Figure 12:
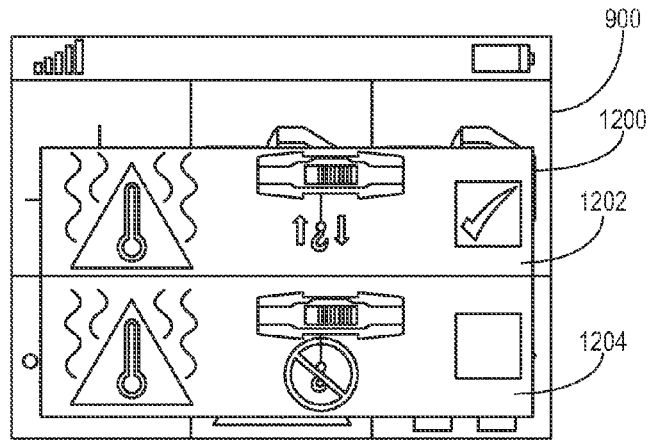

For example, in response to receiving a selection the brightness icon 902, the MCU of the remote may display a brightness adjustment display panel 1000 shown in FIG. 10. The user of the remote may then adjust the brightness of the display screen of the remote by using the first navigation button 408 (e.g., left navigation button) and the second navigation button 410 (e.g., right navigation button). For example, as the remote receives inputs via the right navigation button, a sliding bar 1002 moves to the right (e.g., away from the sun icon) and the MCU of the remote may increase the brightness of the display screen. Conversely, as the remote receives inputs via the left navigation button, the sliding bar 1002 moves to the left (e.g., toward the sun icon) and the MCU of the remote may decrease the brightness of the display screen. The brightness adjustment display panel 1000 may close in response to receiving an input via the selection button 412 (e.g., a user pressing the selection button 412).

The user interface of the remote may display an auxiliary linking display panel 1100 upon receiving a selection of one of the first auxiliary icon 904 or the second auxiliary icon 906. The auxiliary linking display panel 1100 allows a user to link the auxiliary systems coupled with the winch to be linked to the vehicle's (e.g., the vehicle in which the winch and auxiliary systems are installed) high beam setting. For example, the winch controller may be electrically coupled to a vehicle circuit, such as the vehicle's high beam circuit. When the linking feature is activated via the linking display panel 1100, the auxiliary channel that has been linked may not function unless the vehicle circuit that it has been connected to is ON. If the vehicle circuit is OFF, then the linked auxiliary will also be OFF. The first auxiliary device and the second auxiliary device may be linked separately. In this way, auxiliary lights coupled to the winch may be OFF unless the vehicle high beams are ON. In other embodiments, the linking feature may be used to link the vehicle's ignition ON wire or any other vehicle circuit desired to the winch and attached auxiliary systems.

A default setting of the auxiliary systems may be for the auxiliary devices to be unlinked with the vehicle's high beam setting. The auxiliary linking display panel 1100 includes a top panel 1102 corresponding to the first auxiliary system and bottom panel 1104 corresponding to the second auxiliary system, each panel showing a high beam icon 1106, a link icon 1108, an auxiliary icon 1110, and a check box icon 1111. When one of the first auxiliary icon 904 or the second auxiliary icon 906 is selected, the corresponding top panel 1102 or bottom panel 1104 is highlighted. In one example, highlighting may include illuminating the selected panel more than the other unselected panel. In another example, highlighting may include outlining the selected panel more than the other unselected panel.

The auxiliary system corresponding to the highlighted panel may then be adjusted by checking or un-checking the check box icon 1111 via the selection button 412. For example, in FIG. 11 the bottom panel 1104 is highlighted. The auxiliary systems may, by default, be in the unlinked state, as indicated by two links of the link icon 1108 being spaced apart from one another (and not touching), as shown in the top panel 1102 of FIG. 11. The left and right navigation buttons of the remote may be used to highlight the link icon 1108. Upon receiving an input via the selection button 412, a check may appear in the check box icon 1111, as shown in the bottom panel 1104 of FIG. 11. In response to actuation of the selection button after highlighting the link icon 1108, the MCU of the remote may send a signal to the MCU of the remote which then sends a corresponding signal to a controller of the vehicle to link the selected auxiliary system to the vehicle's high beam setting.

The user interface of the remote may display a thermal protection display panel 1200 upon receiving a selection of the thermal protection icon 910. The thermal protection display panel 1200 allows the user to activate or deactivate a thermal protection setting of the winch. When the thermal protection setting is activated, the winch may shut off automatically when a winch temperature reaches and/or increase above a threshold temperature. For example, the winch temperature may be the winch motor temperature and the threshold temperature may be an upper threshold motor temperature at which continued winch operation may result in degradation of the winch. Thus, when the winch temperature increases above the threshold temperature, the MCU of the winch may stop operation of and turn off the winch. In this way, winch degradation may be reduced when the thermal protection setting is activation.

The thermal protection display panel 1200 includes a top thermal shut-off deactivation panel 1202 and a bottom thermal shut-off activation panel 1204. The top thermal shut-off deactivation panel 1202 allows the user to deactivate the thermal protection system such that the winch will not shut off upon reaching (or increasing above) the threshold temperature. For example, the user may use the navigation buttons of the remote to highlight the top thermal shut-off deactivation panel 1202. A single user input via the selection button may deactivate the thermal protection system. Conversely, the user may highlight the bottom thermal shut-off activation panel 1204 and then select (with the selection button) the top panel in order to activate the thermal protection system. As such, the winch may turn off when the winch temperature reaches and/or increases above the threshold temperature.

Figure 13:
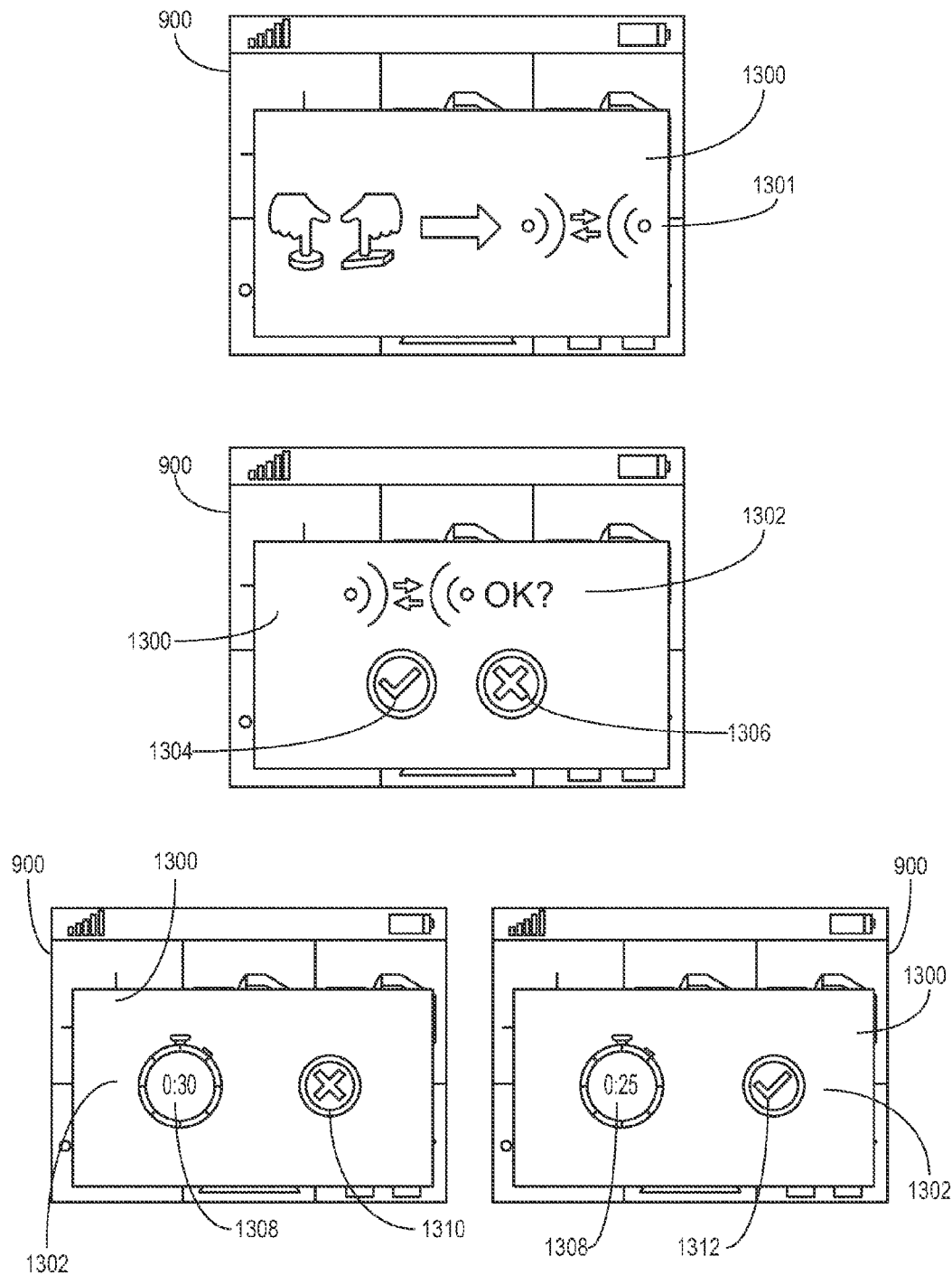

The user interface of the remote may display a pairing panel 1300 presenting an activation display 1301 upon receiving a selection of the pairing icon 908, as shown at FIG. 13. Said another way, a single user activation of the selection button, after highlighting the pairing icon 908 using the navigation buttons, may generate the activation display 1301. A single activation of both the selection button 412 and the second navigation button 410 at one time while the pairing activation display 1301 is displayed in the pairing panel 1300 may generate a paring confirmation display 1302 in the pairing panel 1300. The pairing confirmation display 1302 includes a check icon 1304 and an x icon 1306. Upon selecting the x icon 1306, the user interface of the remote may close the pairing panel 1300 and display the settings menu display 900. If a user selects the check icon 1304 using the buttons of the remote, the paring confirmation display 1302 displays a timer icon 1308 which counts down from a set time (e.g., 30 seconds). During this time, the wireless control unit of the remote may attempt to pair with the wireless control module of the winch. As such, the pairing confirmation display 1302 displays an x icon 1310 while the remote and winch remain unpaired. A user may also activate (e.g., turn on) the wireless control activation switch of the winch during this time. Upon successful pairing between the winch and the remote, the x icon 1310 switches to a check icon 1312 indicating that the remote is paired with the winch (e.g., the winch and remote may communicate wirelessly and send signals to each other's MCU). In the event that pairing is unsuccessful, the x icon 1310 may remain displayed while the timer icon 1308 displays zero. A user may close the pairing panel 1300 with a single user selection of the selection button 412.

Figure 14:
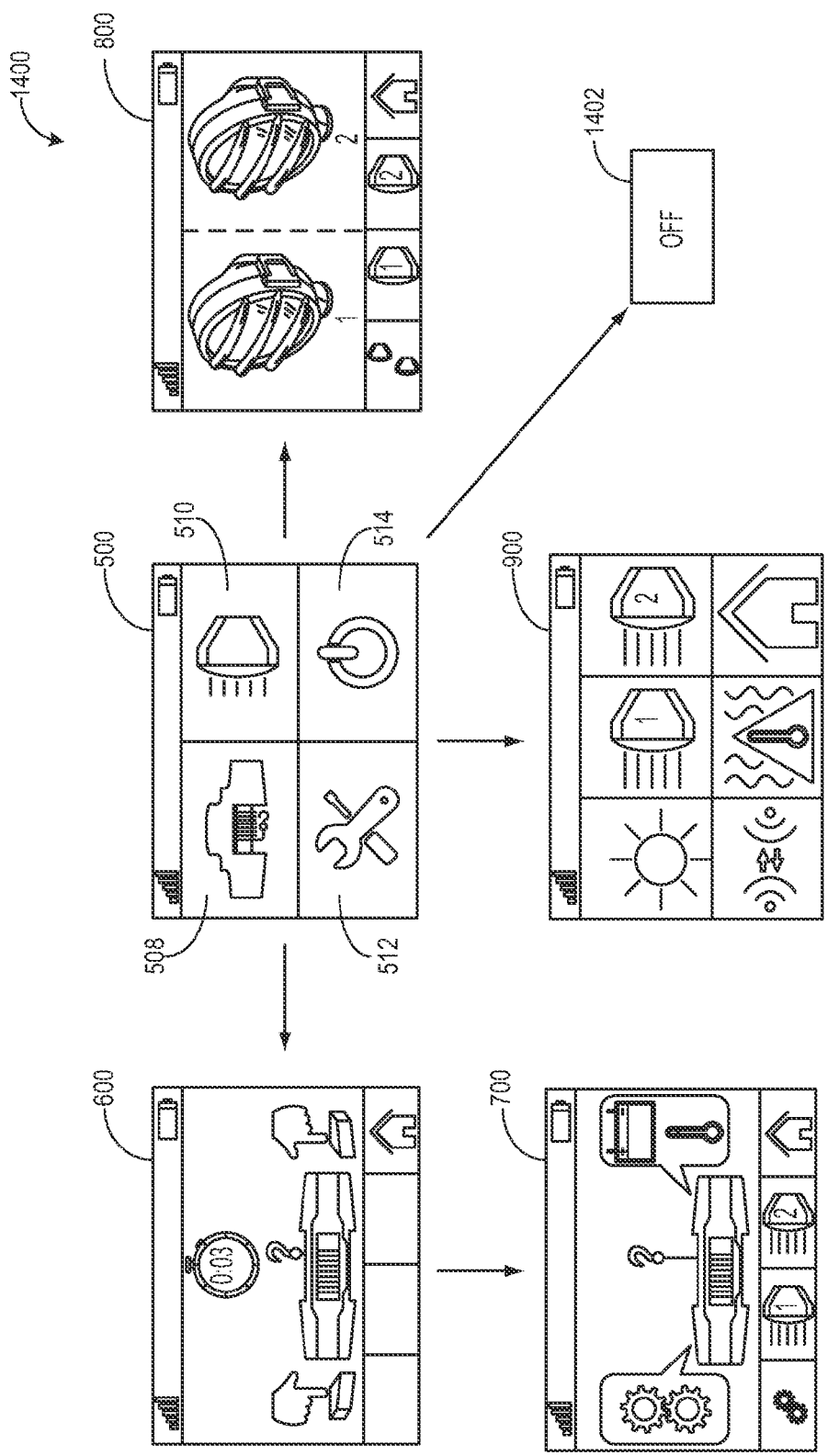
FIG. 14 shows an example control flow for a wireless remote user interface for a winch.
Figure 15:
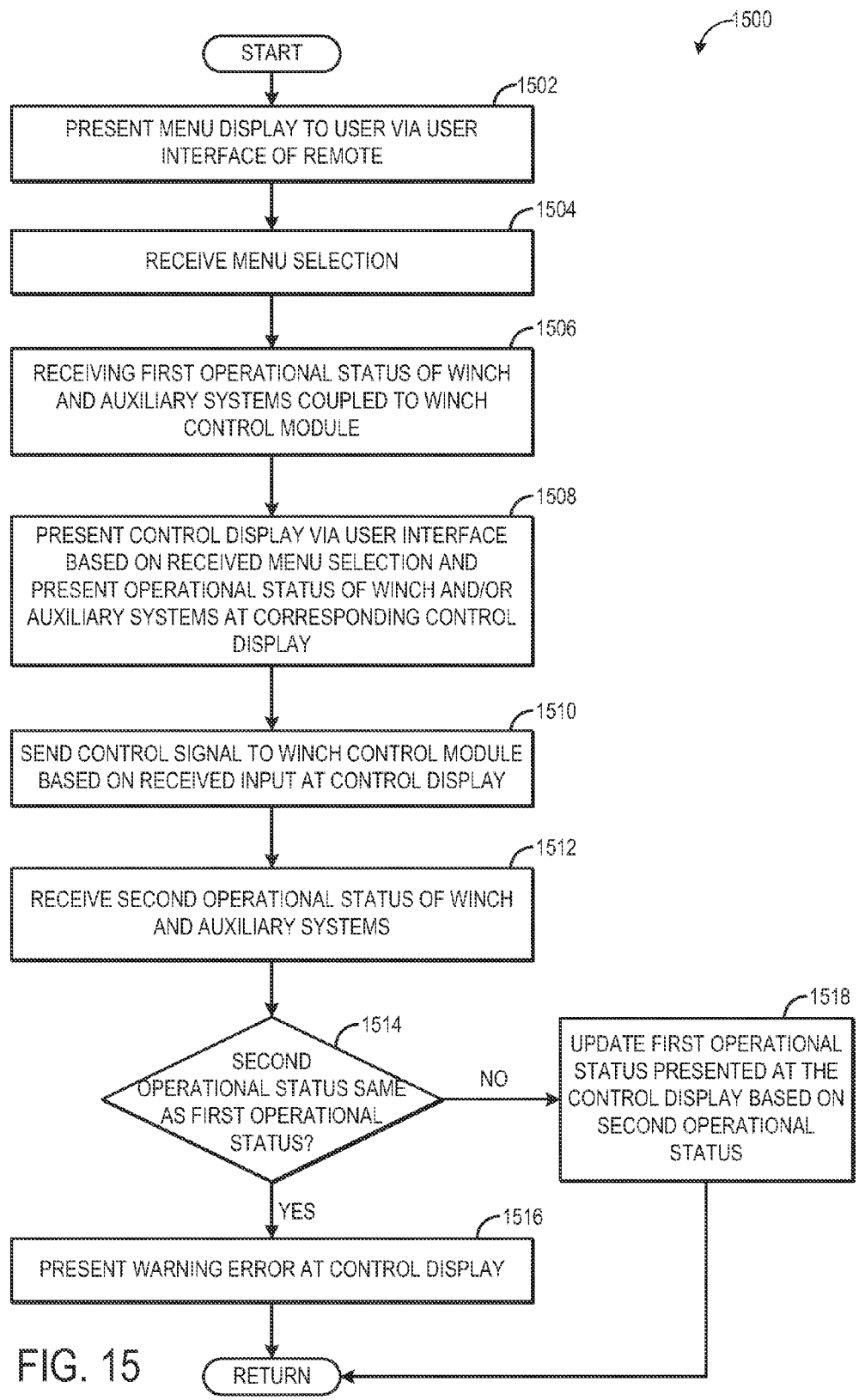
FIG. 15 shows a flow chart of a method for controlling winch operation with a remote user interface.

Turning now to FIG. 14, schematic 1400 shows an example control flow for the wireless remote user interface for the winch. As described above, the user interface of the remote includes a plurality of control displays, the control displays including the winch operation display 700, auxiliary operation display 800, and settings menu display 900. All of the control displays may be reachable from a same menu display 500. For example, upon receiving a selection of the winching icon 508, the user interface displays the winch activation display 600. The selection of the winching icon 508 may include a single actuating event including actuating only a single button of the remote without any additional inputs. At the winch activation display 600, receiving two simultaneous inputs from two different remote buttons may result in generation of the winch operation display 700. The two different remote buttons may include the right and left navigational buttons. In alternate embodiments, the winch operation display 700 may be reachable directly from the menu display 500 without the intermediate screen of the winch activation display 600. The winch operation display 700 may display winch operational status information and vehicle battery level status. Additionally, signals for controlling both the winch and one or more auxiliary systems may be generated based on inputs from the winch operation display 700.

Alternately, upon receiving a selection of the auxiliary icon 510, the user interface displays the auxiliary operation display 800. The selection of the auxiliary icon 510 may include a single activation event including activating only a single button of the remote (e.g., the selection button 412) without any additional inputs. Thus, the auxiliary operation display 800 may be reachable from the menu display 500 by only the single activating event at one time. The auxiliary operation display 800 displays operational status of one or more auxiliary systems coupled with the winch (e.g., electrically coupled with the winch control module). Additionally, a single selection (e.g., only a single input with only one remote button) may turn on/off a first auxiliary system, a second auxiliary system, or both auxiliary systems at the same time from the auxiliary operation display 800.

Further still, a selection of the settings icon 512 may generate the settings menu display 900. The selection of the settings icon 512 may include only a single activation event of a single button of the remote. At the settings menu display 900, a user may adjusting remote settings, auxiliary system settings, and winch operational settings, as described above with reference to 900. A user may adjust the different settings using only a subset of remote buttons. For example, all settings adjustments via the settings menu display 900 may be activated using only three remote buttons (e.g., the first navigation button 408, second navigation button 410, and the selection button 412). Finally, the remote may be turned off at 1402 upon selection of the power icon 514 at the menu display 500.

As shown in FIG. 14, the user interface of the remote includes only a single menu display 500 where all the other displays (e.g., control displays) of the user interface are reachable from. This may increase the ease of navigating to the different control displays. Further, the menu display 500, as well as the other user interface displays, utilize pictorial icons rather than words to symbolize the different control displays, winch operation status, and auxiliary system operation status. This may allow the remote user interface to be used universally without language barriers. The pictorial icons and displays may also be intuitive, increasing the ease of use of operating the remote and adjusting auxiliary system and winch operation.

Additionally, the control displays may be accessed from the menu display using a finite number of selections (e.g., via a finite number of actuating events). For example, a user may navigate to different icons of the menu or control displays and then select a highlighted icon via a single actuation event at one time. More specifically, the auxiliary operation display may be reached by a single actuation of the selection button and then another single actuation of one of the icons of the auxiliary operation display may turn on or off one or more auxiliary devices. Further, the winch operation display may be reached by a first actuation of the selection button and then a second actuation, following the first actuation, of both the first and second navigation buttons simultaneously. Then, another single actuation of one of the icons of the winch operation display may adjust a position of the winch clutch or turn on or off one or more auxiliary devices. In this way, adjusting winch and auxiliary system operation may be performed quickly and easy with a limited number of actuation events (e.g., inputs via the buttons).

Further, the winch and the auxiliary systems may be controlled from separate control displays (e.g., the winch operation display and the auxiliary operation display) or from the same control display (e.g., the winch operation display). Controlling the auxiliary system devices and the winch from the same control display may allow a user to quickly adjust winch and auxiliary operation without navigating through additional menus or control displays. However, a user may only adjust winch operation (e.g., adjust a clutch position and/or a winch power-in or power-out operation) via the winch operation display. This may reduce errors in disengaging the clutch and/or winching in an incorrect direction. For example, winch operation may not be controlled from the auxiliary operation display or the settings display. Instead, if the remote receives an input from one of the power-in or power-out buttons when the user interface is displaying a display other than the winch operation display, the user interface may generate a message prompting the user to simultaneously press the right and left navigation buttons to navigate to the winch operation display.

Turning now to FIG. 15, a method 1500 is shown for adjusting winch operation using a remote having a user interface, such as the user interface described above and shown at FIGS. 5-14. Instructions for carrying out method 1500 may be stored in a memory of a controller, such as MCU 344 of the remote, shown in FIG. 3. As such, the MCU of the remote may carry out method 1500 and send and receive information from a control module of the winch (e.g., the MCU of the winch control module). Further, as discussed above, the remote is wirelessly connected with the control module of the winch. In one example, the remote may control the winch and any auxiliary systems electrically coupled with the winch control module from a distance away from the winch. In another example, the remote may control the winch and any auxiliary systems electrically coupled with the winch control module from inside a vehicle to which the winch is coupled to.

Method 1500 begins at 1502 by presenting a menu display to a user via a user interface of the remote. The menu display may be menu display 500 shown in FIGS. 5 and 14. At 1504, the method includes receiving a menu selection from the user (e.g., from the user of the remote). Receiving a menu selection may include receiving an input via a selection button of the remote when one of the menu icons (e.g., menu items) of the remote is highlighted in the menu display. In one example, the menu selection may be received by a single actuating event at one time, the single actuating event including a simultaneous actuation of one or more buttons of the remote.

The method continues on to 1506 to receive a first operational status of the winch and/or the one or more auxiliary systems (e.g., devices) electrically coupled with the winch from the winch control module. In one example, a first operational status may include one or more of a winch clutch position (e.g., engaged or disengaged with the winch drum, also referred to as the engagement status of the clutch), a winch drum rotation direction (e.g., pulling in or pulling out), a winch temperature (e.g., motor temperature), and/or a power on/off status of the one or more auxiliary systems (e.g., whether auxiliary lights are on or off). The remote may receive additional operational status information such as a vehicle battery level and whether the auxiliary systems are coupled with the vehicle's high-beams. At 1508, the method includes presenting a control display via the user interface based on the received menu selection and presenting the received first operational status of the winch and/or auxiliary systems at the corresponding control display. For example, if the received menu selection is the winching icon, the remote may present the corresponding winch operation control display (e.g., winch operation display 700 shown in FIG. 7) at 1508. The first operational status displayed at the winch operation control display may then be the winch clutch position, the winch drum rotation direction, and/or the winch temperature. In another example, if the received menu selection is the auxiliary icon, the remote may present the corresponding auxiliary operation control display (e.g., auxiliary operation display 800 shown in FIG. 8) at 1508. The first operational status displayed at the auxiliary operation control display may then be whether the first and/or second auxiliary systems are powered-on or powered-off.

At 1510, the method includes sending a control signal to the winch control module based on a received input at the control display. In one example, sending the control signal includes sending a first signal adjusting operation of an auxiliary system electrically coupled with the winch control module based on a first received input at a first control display and sending a second signal adjusting operation of the auxiliary system based on a second received input at a second control display, different than the first control display. For example, the first control display may be the auxiliary operation control display and the second control display may be the winch operation control display. As such, auxiliary system operation (and specifically turning the auxiliary systems on or off) may be controlled from both the auxiliary operation control display and the winch operation control display. In another example, sending the control signal at 1510 includes sending a signal to engage the clutch of the winch with the drum of the winch upon receiving each of an input via a power-out button of the remote, an input via a power-in button of the remote, and an input via selection of a clutch engagement icon at the winch operation display. In this way, the winch clutch may be engaged by any of these inputs. Thus, the winch clutch may be engaged by more than one different input from the remote. However, all of the inputs may be a single actuating event at one time (with no additional inputs required to engaged the clutch). In some examples, the method may further comprise sending a control signal to the winch control module to re-engage the clutch when the clutch has been in a disengaged position for a duration of time or upon returning to the menu display from the winch operation display. In yet another example, sending the control signal at 1510 includes sending a signal to adjust activation of a thermal protection setting of the winch based on a first received input at a settings menu control display (e.g., settings menu display 900 shown in FIG. 9), the thermal protection setting including a command to automatically shut off the winch when a winch temperature reaches a threshold temperature. The winch temperature may be a winch motor temperature. Additionally, the method may include adjusting a display setting of the remote based on a second received input at the settings menu display, the display setting including a brightness of the user interface.

Continuing to 1512, the method includes receiving a second operational status of the winch and/or auxiliary systems electrically coupled with the winch control module. The second operational status may be received following sending the control signal to the control module. In one example, the first operational status and the second operational status may be the same type of status (e.g., a winch clutch engagement status) and the control signal may be related to changing the same status (e.g., changing the position of the winch clutch and thus the winch clutch engagement status). At 1514, the method includes determining if the second operational status is the same as the first operational status. If the second operational status is the same as the first operational status, it may indicate that sending the control signal was unsuccessful and/or some system failure occurred preventing the operational status from changing as commanded. As a result, the method at 1516 includes presenting a warning error at the control display indicating the operational status did not change as commanded. In one example, the warning error may indicate that the winch clutch did not adjust as requested when the commanded control signal was a command to change the winch clutch position (e.g., engage or disengage the clutch). Other warning errors may include warning errors indicating failure of a winch drum to change rotation direction and/or failure of an auxiliary system to turn on or off as commanded.

Alternatively at 1514, if the second operational status is not the same as the first operational status (e.g., the first and second operational status are different), the method continues on to 1518 to update the first operational status presented at the control display based on a second operational status received following sending the control signal to the control module. Updating the first operational status may include changing the display of the specific status display. For example, if the first operational status includes the winch clutch being engaged and the second operational status includes the winch clutch being disengaged, the clutch status display (e.g., clutch status display 704) may change from displaying two gear icons coupled to one another to displaying two gear icons separated (by a distance) from one another.

In this way, a user interface of a remote for a winch may allow a user to adjust operation of the winch and one or more auxiliary devices electrically coupled with a control module of the winch. The remote may allow the user to adjust winch and auxiliary device operation without requiring separate control switches. For example, the remote may allow the user to stand at a distance from the vehicle when the winch is in use. Furthermore, the remote allows the user to adjust the clutch actuator into free spool mode (e.g., disengage the clutch from the drum) at a remote location without having to manually do so at the winch. This allows the user to spool out the winch cable and attach the cable to another vehicle or structure without having to return to the winch before activating the winch. Furthermore, the use of the winch control module for controlling various accessories greatly reduces the amount of wiring that is needed to be added to a vehicle in order to power the accessories.

Additionally, as described above, the user interface including multiple control displays reachable from a single menu display allows a remote user to adjust many different winch and auxiliary operations with only a few remote buttons and inputs via the buttons. As such, a technical effect is achieved by allowing a user to quickly and easily adjust winch and auxiliary operation from a remote location with a finite set of non-dedicated remote buttons (e.g., the navigation and selection buttons). Further, the displays of the user interface as described above are graphic without words, thereby proving intuitive remote operation in any language. By linking all the control displays to the single menu display, winch settings, winch operation, and auxiliary operation may all be adjusted successively without a large number of inputs. Further, winch operation may be accessed via a single actuating event from any screen and auxiliary operation may be controlled from at least two control displays. This may further increase the ease of use of the remote and reduce a time to adjust winch and/or auxiliary operation.

Further still, the linked structure between the single menu display and the multiple control displays is important for accurate and purposeful winch control. The control display screen and menu display screen as described herein are configured to be connected to one another. However, the different control functions (e.g., winch control vs. auxiliary control vs. settings control) are also at least partially separated from one another via the separated control displays. For example, all the control functions are not included on a single user interface display, but several different dedicated displays that are all reachable from the single, central menu display. Separating the control displays into the winch operation display, auxiliary operation display, and settings menu display may also for errant control signals sent via the wireless to be reduced. By having different control displays controlling different winch and auxiliary functions with different inputs (e.g., via different selectable icons), the chance of sending an incorrect or unintended control signal may be reduced. For example, winch operation may only be adjusted from one control display (the winch operation display) and no other control display of the user interface.

Previous devices utilizing dedicated buttons for sending each control signal may result in more errant wireless signals being sent to the winch. For example, actuating one dedicated button for adjusting the winch clutch or winch drum rotation direction may result in a control signal being send to the winch control module. By instead only adjusting winch operation from one control display, as described herein, control errors by making an incorrect selection may be reduced. Additionally, the winch operation control display may only be reachable via simultaneous actuation of two remote buttons positioned on opposite sides of the remote. This may require a user to use both hands to activate the winch operation display in order to adjust winch operation, thereby further reducing accidental adjustment to winch clutch position or winch drum rotation. Even if the dedicated winch power-in and power-out buttons are pressed, the winch drum and/or clutch may only adjust if the user interface is displaying the winch operation display. Thus, this linked and dedicated operation display user interface setup may increase the accuracy of starting/stopping the winch and reduce delays in performing an intended control function while also reducing errant winch control that may be dangerous for the user.

As one embodiment, a user interface of a remote for a winch comprises a menu display including a plurality of menu items, the menu items navigable and selectable with a series of buttons of the remote and a plurality of control displays, each of the plurality of control displays generated upon selection of a corresponding menu item of the plurality of menu items, each of the plurality of control displays including selectable icons for controlling one of an operation of a winch, an operation of one or more auxiliary devices, or settings of the remote. The plurality of control displays includes a winch operation display, an auxiliary operation display and a settings menu display and the winch operation display is reachable from any other control display of the plurality of control displays via actuation by only a single user actuating event at one time. In one example, the single user actuating event includes an actuation of two buttons of the series of buttons at one time. Additionally, the menu display is reachable from any control display of the plurality of control displays via actuation by only a single user actuating event at one time, the single user actuating event including an actuation of only one button of the series of buttons at one time. In another example, selectable icons for controlling operation of the one or more auxiliary devices are included in at least two different control displays of the plurality of control displays. For example, the two control displays may include a winch operation control display and an auxiliary operation control display.

The plurality of control displays includes a winch operation display including a winch clutch status display displaying whether a winch clutch is engaged or disengaged with a winch drum, a winch operation direction status display displaying in which direction the winch drum is rotating, a clutch engagement icon selectable with the series of buttons, and one or more auxiliary icons selectable with the series of buttons. The winch clutch status display includes two gear icons movable relative to one another, the winch clutch status display displaying the two gear icons separated from one another when the winch clutch is disengaged from the winch drum and the two gear icons coupled together when the winch clutch is engaged with the winch drum. The winch operation display further includes a vehicle battery level display and a winch motor temperature display. Additionally, the winch clutch status display includes a warning error generated when the winch clutch does not move as requested after selection of the clutch engagement icon. The winch operation direction status display includes a directional arrow indicating whether the winch is pulling in or pulling out and wherein a direction of the directional arrow changes after input from one of a winch power-out button or winch power-in button of the remote.

The plurality of control displays also include an auxiliary operation display including one or more auxiliary status displays displaying an operational status of one or more auxiliary systems electrically coupled with the winch, one or more auxiliary icons selectable with the series of buttons, and a dual auxiliary icon selectable with the series of buttons.

As another embodiment, a remote for a winch comprises a microcontroller adapted to generate a user interface presentable to a remote user. The user interface includes a menu display including a plurality of menu items and a plurality of control displays, each control display of the plurality of control displays generated based on a user selection of one of the plurality of menu items from the menu display. The remote further comprises first and second navigation buttons adapted to navigate to and highlight each of the plurality of menu items, a single selection button adapted to select a highlighted menu item, and a radio module in wireless communication with a control module of the winch. The first and second navigation buttons may be used to scroll through the plurality of menu items of the menu display. For example, a cursor may move between menu items as inputs are received from the first and/or second navigation buttons. A highlighted menu button (e.g., where the cursor has stopped) many then be selected via input from the selection button.

The remote further comprises a dedicated power-in button and power-out button adapted to send a signal to the control module of the winch to engage a winch clutch with a winch drum and rotate the winch drum. Additionally, each control display includes a plurality of icons selectable with the single selection button. Further, the remote has only the first and second navigation buttons, the single selection button, the power-in button, and the power-out button for adjusting operation of the winch, adjusting operation of one or more auxiliary systems, adjusting settings of the remote, and wirelessly pairing the remote with the control module. As such, the remote includes no additional buttons for adjusting winch operation, auxiliary operation, remote settings, or wireless paring of the remote.

As yet another embodiment, a control module of a winch comprises a controller in communication with one or more auxiliary devices and a user interface in communication with the control module and adapted to control a plurality of winch settings of the winch and adjust operation of the one or more auxiliary devices, where the user interface is adapted to display a menu including a plurality of menu inputs and a control screen upon selection of one of the plurality of menu inputs. The control screen (e.g., control display) may include one or more of a settings menu display, a winch operation display, and/or an auxiliary operation display.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A user interface of a remote for a winch, comprising:
   a menu display including a plurality of menu items, the plurality of menu items navigable and selectable with a series of buttons of the remote; and
   a plurality of control displays, each of the plurality of control displays generated upon selection of a corresponding menu item of the plurality of menu items, each of the plurality of control displays including selectable icons for controlling one of an operation of a winch, an operation of one or more auxiliary devices, or settings of the remote.

2. The user interface of claim 1, wherein the plurality of control displays includes a winch operation display, an auxiliary operation display and a settings menu display and wherein the winch operation display is reachable from any other control display of the plurality of control displays via actuation by only a single user actuating event at one time.

3. The user interface of claim 2, wherein the single user actuating event includes an actuation of two buttons of the series of buttons at one time, the two buttons positioned away from one another on opposite sides of the remote.

4. The user interface of claim 1, wherein the menu display is reachable from any control display of the plurality of control displays via actuation by only a single user actuating event at one time, the single user actuating event including an actuation of only one button of the series of buttons at one time.

5. The user interface of claim 1, wherein selectable icons for controlling operation of the one or more auxiliary devices are included in at least two different control displays of the plurality of control displays.

6. The user interface of claim 1, wherein the plurality of control displays includes a winch operation display including a winch clutch status display displaying whether a winch clutch is engaged or disengaged with a winch drum, a winch operation direction status display displaying in which direction the winch drum is rotating, a clutch engagement icon selectable with the series of buttons, and one or more auxiliary icons selectable with the series of buttons.

7. The user interface of claim 6, wherein the winch clutch status display includes two gear icons movable relative to one another, the winch clutch status display displaying the two gear icons separated from one another when the winch clutch is disengaged from the winch drum and the two gear icons coupled together when the winch clutch is engaged with the winch drum.

8. The user interface of claim 6, wherein the winch operation display further includes a vehicle battery level display and a winch motor temperature display and wherein the winch clutch status display further includes a warning error generated when the winch clutch does not move as requested after selection of the clutch engagement icon.

9. The user interface of claim 6, wherein the winch operation direction status display includes a directional arrow indicating whether the winch is pulling in or pulling out and wherein a direction of the directional arrow changes after input from one of a winch power-out button or winch power-in button of the remote.

10. The user interface of claim 1, wherein the plurality of control displays includes an auxiliary operation display including one or more auxiliary status displays displaying an operational status of one or more auxiliary systems electrically coupled with the winch, one or more auxiliary icons selectable with the series of buttons, and a dual auxiliary icon selectable with the series of buttons.

11. A method for providing remote control of a winch, comprising:
at a remote wirelessly connected with a control module of a winch:
presenting a menu display to a user via a user interface of the remote;
receiving a menu selection from the user;
presenting a control display via the user interface based on the received menu selection; and
sending a control signal to the control module based on a received input at the control display.

12. The method of claim 11, wherein receiving the menu selection includes receiving the menu selection via a single actuating event at one time, the single actuating event including a simultaneous actuation of one or more buttons of the remote, and further comprising presenting an operational status of one or more auxiliary systems electrically coupled with the control module of the winch during the presenting the control display when the control display is an auxiliary operation display, the operational status of the one or more auxiliary systems including whether each of the one or more auxiliary systems is on or off.

13. The method of claim 11, further comprising:
receiving a first operational status of the winch from the control module;
presenting the received first operational status during presenting the control display when the control display is a winch operation display, the first operational status of the winch including a direction of rotation of a drum of the winch and an engagement status of a clutch of the winch; and
updating the first operational status presented at the control display based on a second operational status received following sending the control signal to the control module.

14. The method of claim 13, further comprising presenting a warning error at the winch operation display responsive to the second operational status being the same as the first operational status following sending the control signal to the control module, the warning error indicating that the clutch did not adjust as requested.

15. The method of claim 11, wherein sending the control signal includes sending a first signal adjusting operation of an auxiliary system electrically coupled with the control module based on a first received input at a first control display and sending a second signal adjusting operation of the auxiliary system based on a second received input at a second control display, different than the first control display.

16. The method of claim 11, wherein sending the control signal includes sending a signal to engage a clutch of the winch with a drum of the winch upon receiving each of an input via a power-out button of the remote, an input via a power-in button of the remote, and an input via selection of a clutch engagement icon at a winch operation control display and further comprising sending a control signal to the control module to re-engage the clutch when the clutch has been in a disengaged position for a duration of time or upon returning to the menu display from the winch operation control display.

17. The method of claim 11, wherein the sending the control signal includes sending a signal to adjust activation of a thermal protection setting of the winch based on a first received input at a settings menu display, the thermal protection setting including a command to automatically shut off the winch when a winch temperature reaches a threshold temperature and further comprising adjusting a display setting of the remote based on a second received input at the settings menu display, the display setting including a brightness of the user interface.

18. A remote for a winch, comprising:
a microcontroller adapted to generate a user interface presentable to a remote user, the user interface including:
a menu display including a plurality of menu items; and
a plurality of control displays, each control display of the plurality of control displays generated based on a user selection of one of the plurality of menu items from the menu display;
first and second navigation buttons adapted to navigate to and highlight each of the plurality of menu items;
a single selection button adapted to select a highlighted menu item; and
a radio module in wireless communication with a control module of the winch.

19. The remote of claim 18, wherein the first and second navigation buttons are positioned on opposite sides of the remote with the selection buttons positioned between the first and second navigation buttons, further comprising a dedicated power-in button and power-out button adapted to send a signal to the control module of the winch to engage a winch clutch with a winch drum and rotate the winch drum, the first and second navigation buttons and the selection button positioned in a single row, the single row positioned vertically above the power-in button and power-out button, and further comprising a plurality of grooves on a back surface of the remote, opposite the first and second navigation buttons, the selection button, and the power-in button and power-out button, the plurality of grooves shaped to fit a user's fingers.

20. The remote of claim 19, wherein each control display includes a plurality of icons selectable with the single selection button, and wherein the remote has only the first and second navigation buttons, the single selection button, the power-in button, and the power-out button for adjusting operation of the winch, adjusting operation of one or more auxiliary systems, adjusting settings of the remote, and wirelessly pairing the remote with the control module.

* * * * *